(12) United States Patent
Wang et al.

(10) Patent No.: US 12,087,955 B2
(45) Date of Patent: Sep. 10, 2024

(54) BRACKET, BATTERY ASSEMBLY, AND POWER CONSUMPTION DEVICE

(71) Applicant: CONTEMPORARY AMPEREX TECHNOLOGY CO., LIMITED, Ningde (CN)

(72) Inventors: Kangyu Wang, Ningde (CN); Mu Qian, Ningde (CN); Wenhui Zhang, Ningde (CN); Rongcai Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 264 days.

(21) Appl. No.: 17/551,471

(22) Filed: Dec. 15, 2021

(65) Prior Publication Data

US 2022/0109211 A1 Apr. 7, 2022

Related U.S. Application Data

(63) Continuation of application No. PCT/CN2020/119726, filed on Sep. 30, 2020.

(51) Int. Cl.
*H01M 50/262* (2021.01)
*H01M 50/209* (2021.01)
*H01M 50/249* (2021.01)

(52) U.S. Cl.
CPC ....... *H01M 50/209* (2021.01); *H01M 50/249* (2021.01); *H01M 50/262* (2021.01); *H01M 2220/20* (2013.01)

(58) Field of Classification Search
CPC .......................... H01M 50/262; H01M 50/209
See application file for complete search history.

(56) References Cited

U.S. PATENT DOCUMENTS

| 2019/0081364 A1* | 3/2019 | Capati .................. H01M 50/516 |
| 2021/0320368 A1 | 10/2021 | Huang et al. |
| 2022/0109311 A1 | 4/2022 | Zhang et al. |

FOREIGN PATENT DOCUMENTS

| CN | 207558892 U | * | 6/2018 |
| CN | 109994667 A |   | 7/2019 |

(Continued)

OTHER PUBLICATIONS

Extended European Search report dated Jun. 30, 2022 received in European Patent Application No. EP 20939472.5.

*Primary Examiner* — Maria Laios
*Assistant Examiner* — Jordan E Berresford
(74) *Attorney, Agent, or Firm* — SCULLY, SCOTT, MURPHY & PRESSER, P.C.

(57) ABSTRACT

A bracket, a battery assembly, and a power consumption device are provided. The bracket is configured for being connected to batteries and a power consumption device body; each of the batteries includes a sealed box body and a battery cell accommodated in the box body; the bracket includes a pair of first beams which are oppositely arranged and at least one support beam, and each support beam is connected to the pair of first beams, the at least one support beam separates a space between the pair of first beams into a plurality of subspaces, the plurality of subspaces are arranged along a length direction of the first beam, each subspace is used for accommodating at least one of the batteries, and each support beam separates two adjacent subspaces and is used for installing the box bodies of the batteries accommodated in the two adjacent subspaces.

17 Claims, 12 Drawing Sheets

(56) References Cited

FOREIGN PATENT DOCUMENTS

| CN | 110001372 A | | 7/2019 | |
|---|---|---|---|---|
| CN | 209487558 U | | 10/2019 | |
| CN | 210200841 U | | 3/2020 | |
| CN | 210805843 U | * | 6/2020 | |
| CN | 111668411 A | | 9/2020 | |
| WO | 2019129285 A1 | | 7/2019 | |
| WO | WO-2019129289 A1 | * | 7/2019 | ............... B60K 1/04 |
| WO | 2020135103 A1 | | 7/2020 | |

* cited by examiner

BRACKET, BATTERY ASSEMBLY, AND POWER CONSUMPTION DEVICE

CROSS-REFERENCE TO RELATED APPLICATIONS

This application is a continuation of International Application No. PCT/CN2020/119726, filed on Sep. 30, 2020, the disclosure of which is hereby incorporated by reference in its entirety.

FIELD OF TECHNOLOGY

The present application relates to the field of batteries, in particular to a bracket, a battery assembly, and a power consumption device.

BACKGROUND

As a main energy storage element of a vehicle, a battery is a key component of the vehicle, and directly affects the performance of the vehicle. In related art, the battery is directly installed to a vehicle body of the vehicle, or is installed to the vehicle body by using a bracket. In the way of directly installing the battery to the vehicle body, the battery and the vehicle body are usually connected through bolts, however, the battery is inconvenient to be installed and detached, and quick replacement of the battery is not facilitated. In the way of installing the battery to the vehicle body by using the bracket, the bracket is generally a cuboid annular frame for installing a single battery. In the length direction of the bracket, the strength at the middle part is low, so that the installation reliability of the battery on the bracket cannot be guaranteed.

SUMMARY

Embodiments of the present application aims to provide a bracket, a battery assembly, and a power consumption device, and the reliability of installing batteries on the bracket can be guaranteed.

In a first aspect, a bracket is provided. The bracket is configured to be connected to batteries and a power consumption device body; a battery of the batteries includes a sealed box body and a battery cell accommodated in the box body; the bracket includes a pair of first beams and at least one support beam, the pair of first beams are oppositely arranged, each support beam is connected to the pair of first beams, a space between the pair of first beams is separated by the at least one support beam into a plurality of subspaces, the plurality of subspaces are arranged along the length direction of the first beams, each subspace is used for accommodating at least one of the batteries, two adjacent spaces is separated by each support beam, and each support beam is configured to install the box bodies of the batteries accommodated in the two adjacent subspaces.

Compared with the bracket in the related art, due to the arrangement of the support beam, the strength of the bracket provided by the embodiments of the present application is enhanced. Hence, when the batteries are installed, the reliability of installing the batteries may be improved.

Moreover, since the batteries in the adjacent subspaces take the support beam as a public installation structure, the bracket structure can be made more compact, and the space utilization rate is high. Hence, in the case that the batteries installation space of the vehicle is fixed, the size of the batteries accommodating space can be increased as much as possible, thus facilitating the increase of the batteries volume and increase of the energy density of the batteries.

In some embodiments, the bracket includes a first locking mechanism, the first locking mechanism is installed on a support beam of the at least one support beam and is configured to lock the box body of the battery on the support beam.

In some embodiments, the first locking mechanism is arranged inside the support beam.

The advantages of arranging the first locking mechanism inside the support beam are as follows: firstly, the space can be saved, and the batteries accommodating space of the bracket is increased; secondly, the first locking mechanism can be protected, so that the first locking mechanism is prevented from being affected by an external environment, for example, the first locking mechanism is prevented from being corroded by rainwater and mud, and locking reliability and unlocking reliability of the first locking mechanism are guaranteed; and thirdly, due to the fact that the support beam is of a hollow structure, the weight can be reduced, and the light weight of the bracket is facilitated.

In some embodiments, the support beam includes a support beam body and a support beam cover body, a cross section of the support beam body is U-shaped, and the support beam body is provided with an opening; the first locking mechanism is arranged inside the support beam body, and the support beam cover body covers the opening of the support beam body.

The support beam body is of a U-shaped design, the structure is relatively simple while guaranteeing the providing of an installation space for the first locking mechanism.

In some embodiments, the opening of the support beam body is downward.

After the bracket is installed to the vehicle body, due to the fact that the opening of the support beam body is downward, when there is a problem with the first locking mechanism or other mechanisms arranged inside the support beam body, the first locking mechanism or other mechanisms can be conveniently maintained or replaced.

In some embodiments, each support beam is provided with two rows of first locking mechanism, and the two rows of first locking mechanism are arranged along the length direction of the first beams; and each row of the first locking mechanism includes a plurality of first locking mechanism which are arranged along the arrangement direction of the pair of first beams.

The two rows of locking mechanism are arranged to lock the battery to the support beam, and thus the strength of installing the battery to the support beam is improved. Moreover, due to the fact that the two rows of locking mechanism are arranged along the arrangement direction of two subspaces, two corresponding sides of the support beam are uniformly stressed, and the support beam is not prone to being damaged.

In some embodiments, the support beam is provided with a channel extending along a gravity direction of the channel, and the channel extends to a lower surface of the support beam to make a locking part arranged on the box body be capable of entering and exiting the channel; the first locking mechanism is configured to lock the locking part when the locking part moves upwards to a preset position of the channel; and the first locking mechanism is configured to release the locking to the locking part, so that the locking part moves downwards under the action of gravity of the battery to be separated from the channel.

In the process of locking or unlocking the battery, the battery only needs to move upwards or downwards in the channel, and there is no need to adjust the battery in other directions (e.g. front and rear of the vehicle). In particular, when unlocking the battery, after a first locking mechanism releases the locking to the locking part, the locking part of a battery may be separated from the channel under the action of gravity of the battery, the locking and the unlocking of the battery are relatively convenient and efficient, the efficiency of installing and detaching a battery pack is improved, and the quick replacement of the battery is achieved. In addition, for the support beam, only the channel needs to be provided thereon to be matched with the locking part, excessive design is not required, and a structure of the support beam is simplified.

In some embodiments, a first beam of the first beams is provided with a first connecting part for being connected to the power consumption device body, and/or, a support beam of the at least one support beam is provided with a second connecting part for being connected to the power consumption device body.

In some embodiments, the bracket further includes a pair of second beams, the pair of second beams are oppositely arranged, each second beam is connected to the pair of first beams, the at least one support beam is located between the pair of second beams, and the at least one support beam is configured to separate a space enclosed by the pair of first beams and the pair of second beams into a plurality of subspaces.

Due to the fact that each second beam is connected to the pair of first beams, the bracket may be provided with annular structure, and the strength and structure stability of the bracket can be enhanced by the annular structure, and the reliability of installing the battery on the bracket can be further guaranteed.

In some embodiments, the bracket includes a second locking mechanism, and the second locking mechanism is installed on a second beam of the second beams and is configured to lock the box bodies of the batteries to the second beams.

In some embodiments, the second locking mechanism is arranged inside the second beam.

The advantages of arranging the second locking mechanism inside the second beams are as follows: firstly, the space may be saved, and the batteries accommodating space of the bracket is increased; secondly, the second locking mechanism can be protected, and thus the second locking mechanism is prevented from being affected by an external environment, for example, the second locking mechanism is prevented from being corroded by rainwater and mud, and the locking reliability and unlocking reliability of the second locking mechanism are guaranteed; and thirdly, due to the fact that the second beam is of a hollow structure, the weight may be reduced, and the light weight of the bracket is facilitated.

In some embodiments, the second beam includes a second beam body and a second beam cover body; the cross section of the second beam body is U-shaped, and the second beam body is provided with an opening; the second locking mechanism is arranged inside the second beam body, and the second beam cover body covers the opening of the second beam body.

The second beam body is of a U-shaped design, and guarantees the providing of an installation space for the first locking mechanism with a relatively simple structure.

In some embodiments, the opening of the second beam body is downward.

After the bracket is installed to the vehicle body, due to the fact that the opening of the second beam body is downward, when there is a problem with the second locking mechanism or other mechanisms arranged in the second beam body, the second locking mechanism or other mechanisms can be conveniently maintained or replaced.

In some embodiments, the second beam is provided with a channel extending along a gravity direction, and the channel extends to a lower surface of the second beam to make the locking part arranged on the box body be capable of entering and exiting the channel; the second locking mechanism is configured to lock the locking part when the locking part moves upwards to a preset position of the channel; and the second locking mechanism is configured to release the locking to the locking part, thus making the locking part move downwards under the action of gravity of the battery to be separated from the channel.

In the process of locking or unlocking the battery, the battery only needs to move upwards or downwards in the channel, and there is no need to adjust the battery in other directions (e.g. front and rear of the vehicle). In particular, when unlocking the battery, after the second locking mechanism releases the locking to the locking part, the locking part of the battery may be separated from the channel under the action of gravity of the battery, the locking and the unlocking of the battery are relatively convenient and efficient, the efficiency of installing and detaching a battery pack is improved, and the quick replacement of the battery is achieved. In addition, for the second beam, only the channel needs to be provided thereon to be matched with the locking part, excessive design is not required, and a structure of the second beam is simplified.

In some embodiments, the second beam is provided with a third connecting part used for being connected to the power consumption device body.

In some embodiments, the plurality of subspaces are of equal dimensions in the length direction of the first beams.

The plurality of subspaces are of equal dimensions in the length direction of the first beams. Therefore, the plurality of subspaces can be used for installing the batteries with the equal dimension in the length direction of the first beams, and the dimension standardization of the batteries in the length direction of the first beams can be achieved.

In some embodiments, the dimension of each subspace in the length direction of the first beams is 400 mm to 800 mm.

In a second aspect, a battery assembly is provided. The battery assembly includes a plurality of batteries and the bracket provided in the first aspect, where at least one of the batteries is accommodated in each subspace of the bracket, and two adjacent subspaces is separated by each support beam and each support beam is configured to install the box bodies of the batteries accommodated in the two adjacent subspaces.

Due to the fact that the bracket of the battery assembly can carry at least two independent batteries, when one or more batteries are detached for charging or maintaining, the rest batteries can still be used for supplying power to the vehicle, and the normal operation of the vehicle is guaranteed. Moreover, when one of the batteries is damaged, the rest batteries may continue to be used, and the batteries cost is reduced.

In a third aspect, a power consumption device is provided. The power consumption device includes a power consumption device body and the battery assembly provided according to the second aspect, where the bracket of the battery assembly is connected to the power consumption device body.

The batteries are connected to the power consumption device body through the bracket, the bracket may provide an installation space for installation of the batteries, and the quick replacement of the batteries is facilitated.

BRIEF DESCRIPTION OF THE DRAWINGS

To describe the technical solutions in the embodiments of the present application more clearly, the following briefly introduces the accompanying drawings required for describing the embodiments. It should be understood that the following accompanying drawings show merely some embodiments of the present application, and thus should not be considered as limitation to the scope. Those of ordinary skill in the art may still derive other accompanying drawings from these accompanying drawings without creative efforts.

DETAILED DESCRIPTION OF THE EMBODIMENTS

Figure 1:
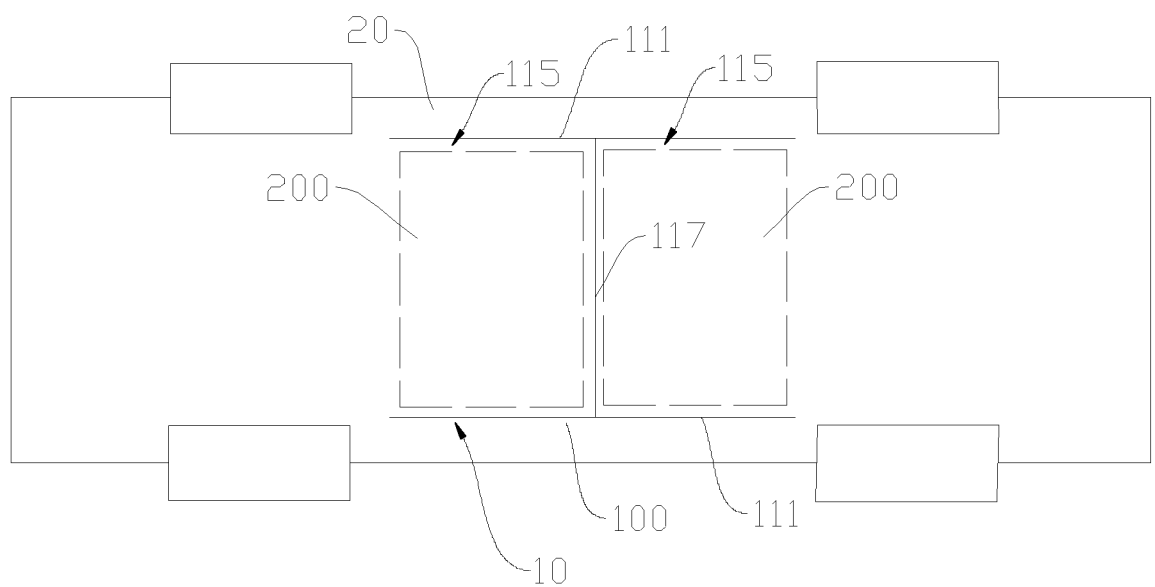
FIG. 1 is an upward view of a power consumption device provided by an embodiment of the present application, where a battery assembly is illustrated.

To make the objectives, technical solutions and advantages of the embodiments of the present application more clearly, the technical solutions in the embodiments of the present application will be clearly and fully described below with reference to the accompanying drawings in the embodiments of the present application. Apparently, the described embodiments are a part of rather than all embodiments of the present application. The assemblies of the embodiments of the present application, as generally described and illustrated in the accompanying drawings herein, may be arranged and designed in a wide variety of different configurations.

As such, the following detailed description of the embodiments of the present application, as provided in the accompanying drawings, is not intended to limit the scope of the present application, as claimed, but is merely representative of selected embodiments of the present application. Based on the embodiments of the present application, all other embodiments obtained by those of ordinary skill in the art without creative efforts shall fall within the scope of the protection of the present application.

It should be noted that similar numerals and letters refer to similar items in the following accompanying drawings, and thus, once a certain item is defined in one accompanying drawing, there is no need to further define and explain the item in subsequent accompanying drawings.

In the description of the present application, it needs to be noted that if the terms "center", "upper", "lower", "left", "right", "vertical", "horizontal", "inner", "outer" and the like indicate the orientation or position relationship based on the orientation or position relationship shown in the accompanying drawings, or the orientation or position relationship that is usually placed when the product is used, the orientation or position relationship is merely for convenience in describing the present application and simplifying the description rather than indicating or implying that the referenced devices or elements must have a particular orientation, be constructed and operated in a particular orientation, and thus should not be construed as limiting the present application. In addition, the presence of the terms "first", "second", and the like in the description of the present application are used only to distinguish the description, and are not to be construed as indicating or implying relative importance.

In addition, the presence of the terms "horizontal" and "vertical" in the description of the present application does not mean that the component is required to be absolutely horizontal or absolutely vertical, but may be slightly inclined. For example, "horizontal" simply means that the orientation is more horizontal than "vertical", and does not mean that the structure must be perfectly horizontal, but may be slightly inclined.

In the description of the present application, it also should be noted that, unless otherwise explicitly specified or limited, the presence of the terms "arranged", "installed", "connected," and "connection" are to be construed broadly, e.g., either a fixed connection, a detachable connection, or an integral connection; either a mechanical connection, or an electric connection; either a direction connection or an indirect connection through an intermediate, or communication in two elements. The specific meaning of the above terms in the present application may be understood as appropriate by those of ordinary skill in the art.

In addition, the battery mentioned in the embodiments of the present application refers to a single physical module including one or more battery cells to provide higher voltage and/or capacity. For example, the battery mentioned in the present application may include a battery pack and the like. The battery cell includes a positive plate, a negative plate, an electrolyte, and a separator, where the separator is arranged between the positive plate and the negative plate to prevent internal short-circuit. The common battery cell is generally divided into three types in a package mode: a cylindrical battery cell, a square battery cell, and a soft package battery cell.

A plurality of battery cells may be connected in series and/or parallel via a bus bar for a variety of application occasions. In some high-power application occasions such as electric vehicle and the like, the application of the battery generally includes three levels: a battery cell, a battery module and a battery pack. The battery module is used to electrically connect a certain number of battery cells together. The battery pack is that components such as a battery management system and the like are assembled on the basis of one or more battery modules, then one or more battery modules is packed into a sealed box body, and then the box body is connected to a chassis of the electric vehicle.

As shown in FIG. 1 the embodiments of the present application provide a power consumption device 1 using batteries as a power source. The power consumption device 1 includes a power consumption device body 20 and a battery assembly 10, where the battery assembly 10 includes a bracket 100 and batteries 200. The bracket 100 is installed on the power consumption device body 20, and the batteries 200 are installed on the bracket 100. That is, each battery 200 is connected to the power consumption device body 20 through the bracket 100. The bracket 100 may provide installation space for the battery 200 to facilitate quick replacement of the battery 200.

It may be understood that the battery described in the embodiments of the present application is applicable to various devices using the battery, such as mobile phones, portable apparatuses, notebook computers, electric bicycles, electric vehicles, ships, spacecrafts, electric toys, electric tools and the like; for example, the spacecrafts include airplanes, rockets, space shuttles, spacecrafts and the like, the electric toys include fixed or mobile electric toys, such as game consoles, electric vehicle toys, electric ship toys, electric airplane toys, and the like; the electric tools include metal cutting electric tools, grinding electric tools, assembly electric tools, and railway electric tools, such as electric drill, an electric grinding machine, an electric wrench, an electric screwdriver, an electric hammer, an electric impact drill, a concrete vibrator and an electric planer.

The battery 200 described in the embodiments of the present application is not limited to being applicable to the above-described a power consumption device, but may further be applicable to all apparatuses using battery.

In one embodiment of the present application, the power consumption device 1 is a vehicle, and the power consumption device body 20 is a vehicle body of the vehicle. As shown in FIG. 1, FIG. 1 is a structure diagram of a vehicle provided by one embodiment of the present application, the vehicle may be a gasoline vehicle, a gas vehicle, or a new energy vehicle, and the new energy vehicle may be a battery electric vehicle, a hybrid electric vehicle, or a range-extended electric vehicle. A motor, a controller and a battery may be arranged inside the vehicle, and the controller is used for controlling the battery to supply power to the motor. The battery may be arranged at the bottom or head or tail of the vehicle. The battery may be used for power supply of the vehicle, for example, the battery may serve as an operational power source of the vehicle for a circuit system of the vehicle, for example, for operating power needs during startup, navigation, and driving of the vehicle. In another embodiment of the present application, the battery may not only serve as an operational power source of the vehicle, but also as a drive power source of the vehicle, to provide driving power for the vehicle instead of or partially instead of fuel oil or natural gas.

As shown in FIG. 1, a plurality of subspaces 115 for installing the batteries 200 are formed in the bracket 100 provided by the embodiments of the present application, and each subspace 115 is accommodated with at least one of the batteries 200. Due to the fact that the bracket 100 of the battery assembly 10 may carry at least two independent batteries 200, when one or more batteries 200 are detached for charging or maintaining, the rest batteries 200 may still be used for supplying power to the vehicle, and the normal operation of the vehicle is guaranteed. Moreover, when one of the batteries 200 is damaged, the rest batteries 200 may continue to be used, and the cost of the batteries 200 is reduced.

The bracket 100 of the present application may be of any appropriate structure. As shown in FIG. 2 to FIG. 8, in the embodiment of the present application, the bracket 100 may include a pair of first beams 111 and at least one support beam 117. Where the pair of first beams 111 are oppositely arranged; each support beam 117 is connected to the pair of first beams 111, a space between the pair of first beams 111 is separated by the at least one support beam 117 into a plurality of subspaces 115. That is, the number of the subspace 115 is two and more. The plurality of subspaces 115 are arranged along the length direction of the first beams 111, each subspace 115 is used for accommodating at least one of the batteries 200, each support beam 117 separates two adjacent subspaces 115, and is used for installing box bodies 210 of the batteries 200 accommodated in the two adjacent subspaces 115.

In the bracket 100 provided by the embodiments of the present application, due to the arrangement of the support beam 117, the strength of the bracket 100 is enhanced. Hence, when the batteries 200 are installed, the installation reliability of the batteries 200 can be improved.

Moreover, since the batteries 200 in the adjacent subspaces 115 take the support beam 117 as a public installation structure, the bracket 100 can be made more compact in structure, and the space utilization rate is high. Hence, in the case that the batteries installation space of the vehicle is fixed, it is beneficial to increase volume of the batteries 200 and increase energy density of the batteries 200.

In addition, as above-mentioned, due to the fact that the bracket 100 may carry at least two independent batteries 200, when one or more batteries 200 are detached for charging or maintaining, the rest batteries 200 may still be used for supplying power to the vehicle, and the normal operation of the vehicle is guaranteed. Moreover, when one of the batteries 200 is damaged, the rest batteries 200 may continue to be used, and the batteries 200 cost is reduced.

In the bracket 100 provided by the embodiment of the present application, the bracket 100 may be of any appropriate shape, and any number of the subspace 115 may be provided, such as two, three, four, etc. Specifically, it may be decided according to factors such as the dimension of the batteries 200 and the batteries installation space of the power consumption device 1 such as a vehicle.

Figure 2:
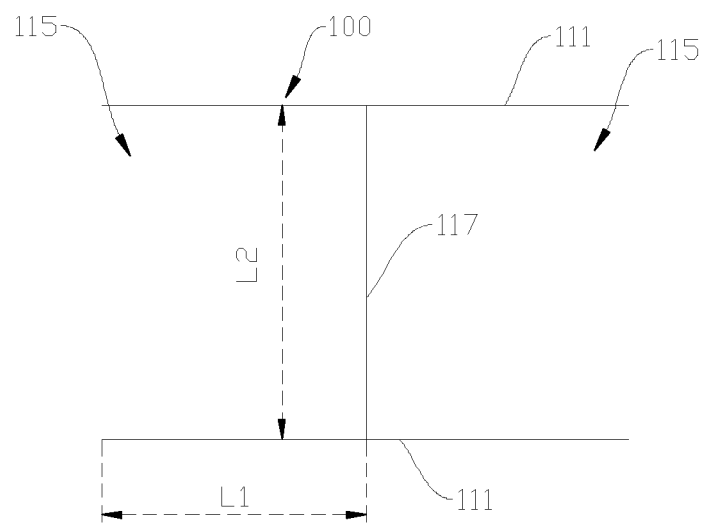
FIG. 2 is a diagram of a bracket provided by an embodiment of the present application.

As shown in FIG. 2, in one embodiment of the present application, the bracket 100 includes a pair of first beams 111 and a support beam 117, and the pair of first beams 111 and the support beam 117 are connected in an I-shaped. The bracket 100 is provided with two subspaces 115. After the bracket 100 is installed to the vehicle body, the two subspaces 115 may be arranged along the longitudinal direction of the vehicle. Certainly, the two subspaces 115 may be arranged along the transverse direction of the vehicle.

In the embodiment, the dimensions L1 of the two subspaces 115 in the length direction of the first beams 111 are equal. Therefore, the two subspaces 115 may be used for installing the batteries 200 having the same dimension L1 in the length direction of the first beams 111, and standardization of the dimensions L1 of the batteries 200 in the length direction of the first beams 111 may be achieved.

In the embodiment, the dimensions L2 of the two subspaces 115 along the arrangement direction of the pair of first beams 111 are equal. Therefore, the two subspaces 115 may be used for installing the batteries 200 having the same dimension L2 in the arrangement direction of the pair of first beams 111, and standardization of the dimensions L2 of the batteries 200 in the arrangement direction of the pair of first beams 111 may be achieved.

In the embodiment, the dimensions L1 of the two subspaces 115 in the length direction of the first beam 111 are equal, and the dimensions L2 of the two subspaces 115 along the arrangement direction of the pair of first beams 111 are equal. Therefore, the two subspaces 115 may be configured to install the batteries 200 with the same dimensions, and the dimension standardization of the batteries 200 is achieved.

After the batteries 200 are standardized, different vehicle models may share the batteries 200 of one dimension specification, instead of preparing the batteries 200 of various dimension specifications, an electric vehicle swapping station only needs to prepare the batteries 200 of one dimension specification, which greatly reduces the investment cost of the electric vehicle swapping station and the management cost of the batteries 200.

Figure 3:
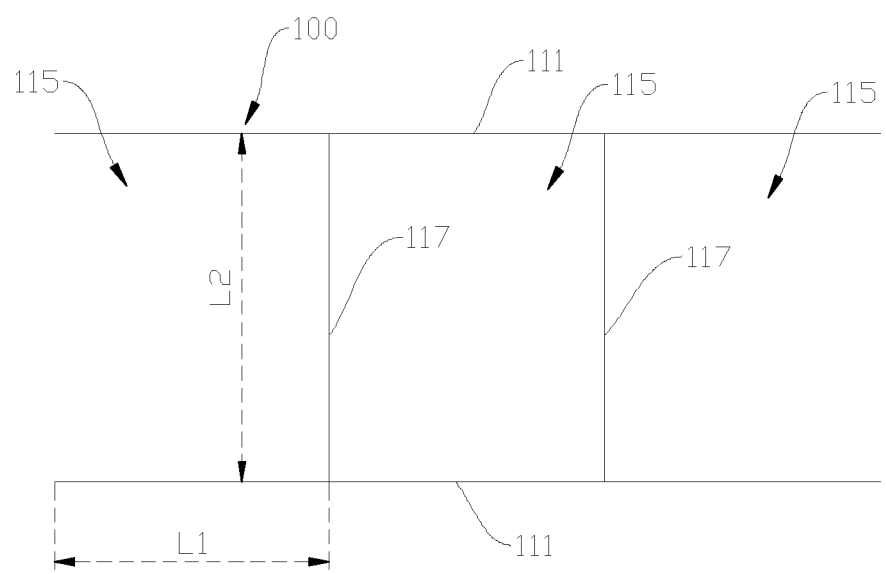
FIG. 3 is a diagram of a bracket provided by an embodiment of the present application.

As shown in FIG. 3, in one embodiment of the present application, the bracket 100 includes a pair of first beams 111 and a pair of support beams 117, and the pair of support beams 117 are arranged in the length direction of the first beams 111 in a spaced manner. The bracket 100 is provided with three subspaces 115 arranged along the length direction of the first beams 111. After the bracket 100 is installed to the vehicle body, the three subspaces 115 may be arranged along the longitudinal direction of the vehicle. Certainly, the three subspaces 115 may be arranged along the transverse direction of the vehicle.

In the embodiment, the dimensions L1 of the three subspaces 115 in the length direction of the first beams 111 are equal. Therefore, the three subspaces 115 may be configured to install the batteries 200 having the same dimension L1 in the length direction of the first beams 111, and standardization of the dimensions L1 of the batteries 200 in the length direction of the first beams 111 may be achieved.

In the embodiment, the dimensions L2 of the three subspaces 115 along the arrangement direction of the pair of first beams 111 are equal. Therefore, the three subspaces 115 may be configured to install the batteries 200 having the same dimension L2 in the arrangement direction of the pair of first beams 111, and standardization of the dimensions L2 of the batteries 200 in the arrangement direction of the pair of first beams 111 may be achieved.

In the embodiment, the dimensions L1 of the three subspaces 115 in the length direction of the first beams 111 are equal, and the dimensions L2 of the three subspaces 115 in the arrangement direction of the pair of first beams 111 are equal. Therefore, the three subspaces 115 may be configured to install the batteries 200 with the same dimension, and the dimension standardization of the batteries 200 is achieved.

As shown in FIG. 4 to FIG. 8, in some embodiments of the present application, the bracket 100 further includes a pair of second beams 112, the pair of second beams 112 are oppositely arranged, each second beam 112 is connected to the pair of first beams 111, the at least one support beam 117 is located between the pair of second beams 112, and the at least one support beam 117 is configured to separate a space enclosed by the pair of first beams 111 and the pair of second beams 112 into a plurality of subspaces 115.

Due to the fact that each second beam 112 is connected to the pair of first beams 111, the bracket 100 may be provided with annular structure, and the annular structure may enhance the strength and structure stability of the bracket 100, and the reliability of installing the batteries 200 on the bracket 100 is further guaranteed. Moreover, the connection between the bracket 100 and the batteries 200 and the connection between the bracket 100 and the power consumption device body 20 are enhanced by arranging the second beams 112, thus guaranteeing the reliability of the connection between the bracket 200 and the batteries 200 and the reliability of the connection between the bracket 100 and the power consumption device body 20. For example, a second locking mechanism 122 and a third connecting part 1123 are provided on each second beam 112 as will be described below.

Figure 4:
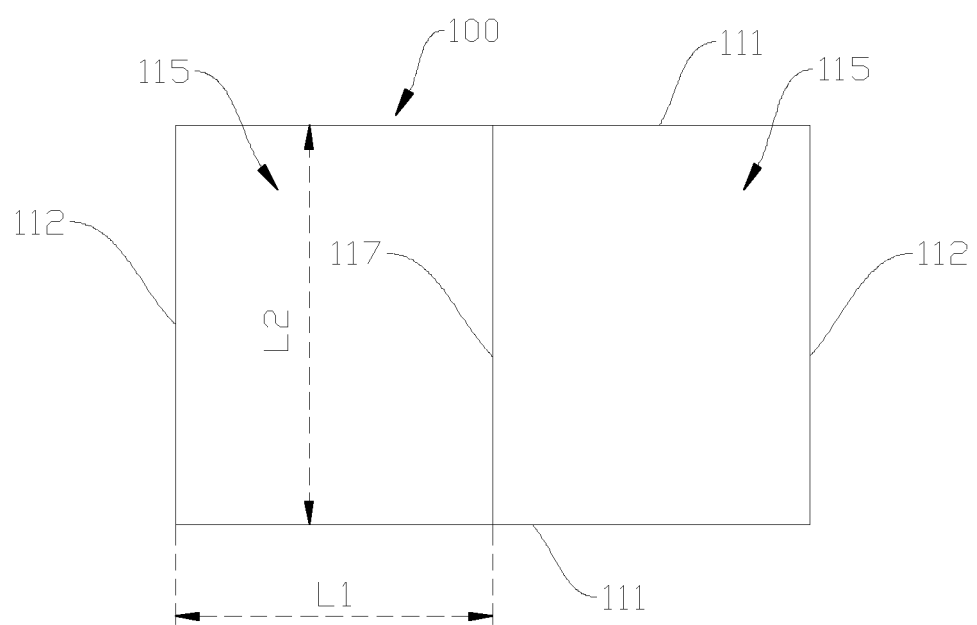
FIG. 4 is a diagram of a bracket provided by an embodiment of the present application.
Figure 5:
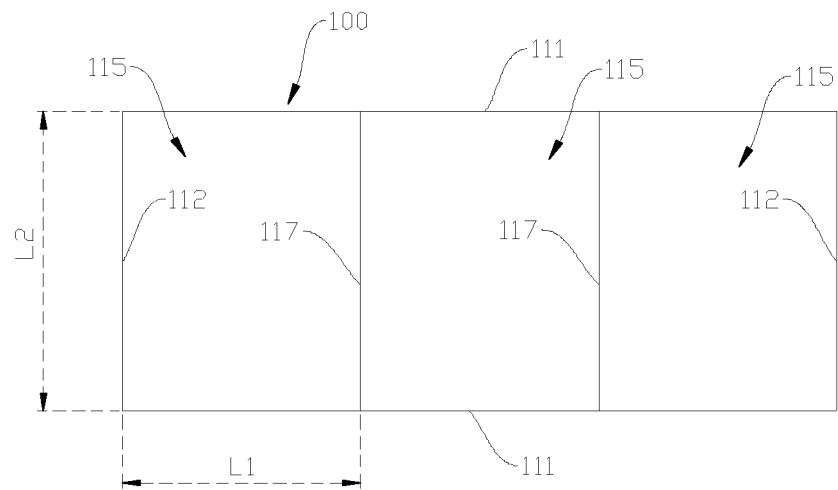
FIG. 5 is a diagram of a bracket provided by an embodiment of the present application.

In the embodiment shown in FIG. 4, the bracket 100 includes a pair of first beams 111, a pair of second beams 112, and a support beam 117. The pair of first beams 111, the pair of second beams 112 and the support beam 117 are connected in a shaped like two rectangles arranged next to each other, and the two rectangles share one side. The bracket 100 is provided with two subspaces 115. In the embodiment shown in FIG. 5, the bracket 100 includes a pair of first beams 111, a pair of second beams 112, and a pair of support beams 117; and the pair of support beams 117 are arranged in the length direction of the first beams 111 in a spaced manner. The pair of first beams 111, the pair of second beams 112 and the pair of support beams 117 are connected in a shaped like three rectangles arranged next to each other in proper order, and any two adjacent rectangles of the three rectangles share one side, and the bracket 100 is provided with three subspaces 115.

In the embodiments of the present application, the dimension L1 of each subspace 115 in the length direction of the first beams 111 may be any appropriate value, and may be specifically decided according to batteries 200. The dimension L1 of each subspace 115 in the length direction of the first beams 111 may be 400 mm to 800 mm Due to the fact that the dimension L1 design of each subspace 115 in the length direction of the first beams 111 is comprehensively considered according to factors such as the batteries installation spaces and endurance mileages of vehicles of different vehicle models, the batteries 200 may be installed on the vehicle and may further meet the requirements of the vehicles of different vehicle models for the battery electric quantity.

In the embodiment of the present application, the dimension L2 of each subspace in the arrangement direction of the pair of first beams 111 may be 1000 mm to 1400 mm Due to the fact that the dimension L2 design of each subspace in the arrangement direction of the pair of first beams 111 is comprehensively considered according to factors such as the batteries installation spaces and endurance mileages of vehicles of different vehicle models, the batteries 200 may be installed on the vehicle and may further meet the requirements of the vehicles of different vehicle models for the battery electric quantity.

Figure 6:
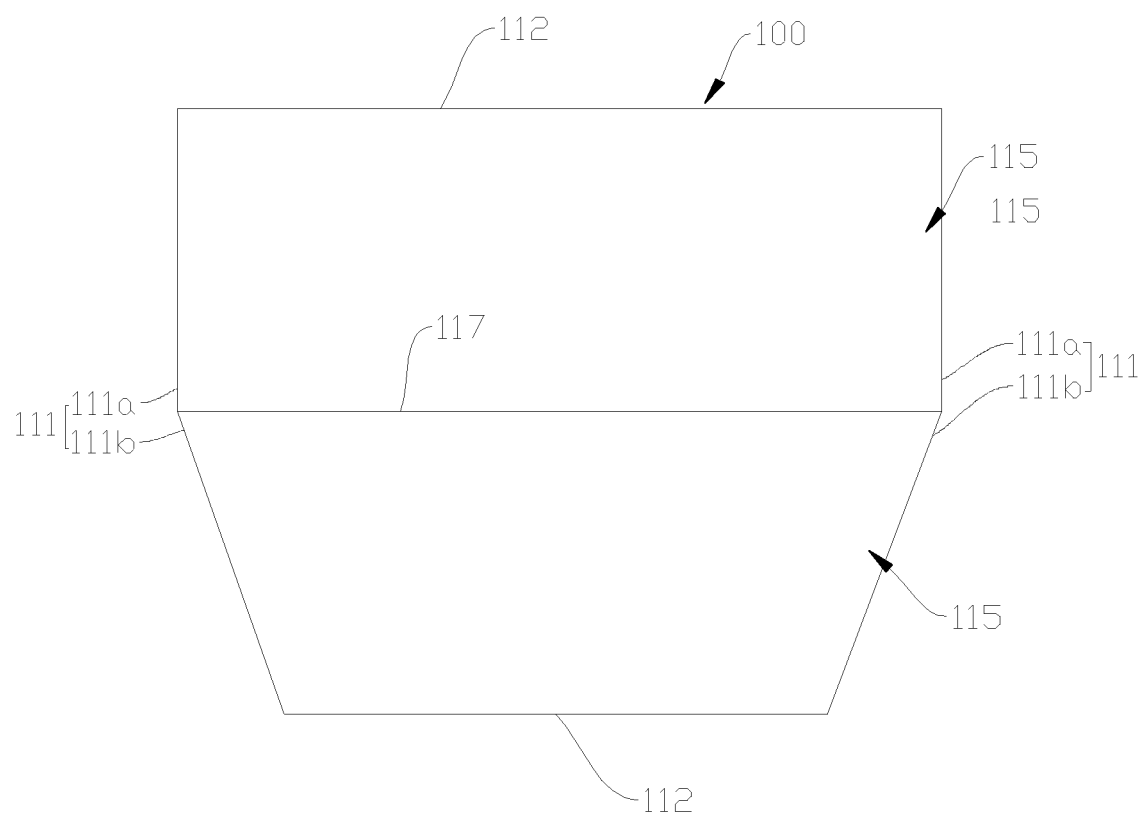
FIG. 6 is a diagram of a bracket provided by an embodiment of the present application.

In the embodiment shown in FIG. 6, the bracket 100 includes a pair of first beams 111, a pair of second beams 112, and a support beam 117. Where each first beam 111 includes a first section 111a and a second section 111b which are connected, the first section 111a and the second section 111b are connected at an obtuse angle, and the support beam 117 is connected to the junction of the first section 111a and the second section 111b. The bracket 100 is provided with two subspaces 115.

Figure 7:
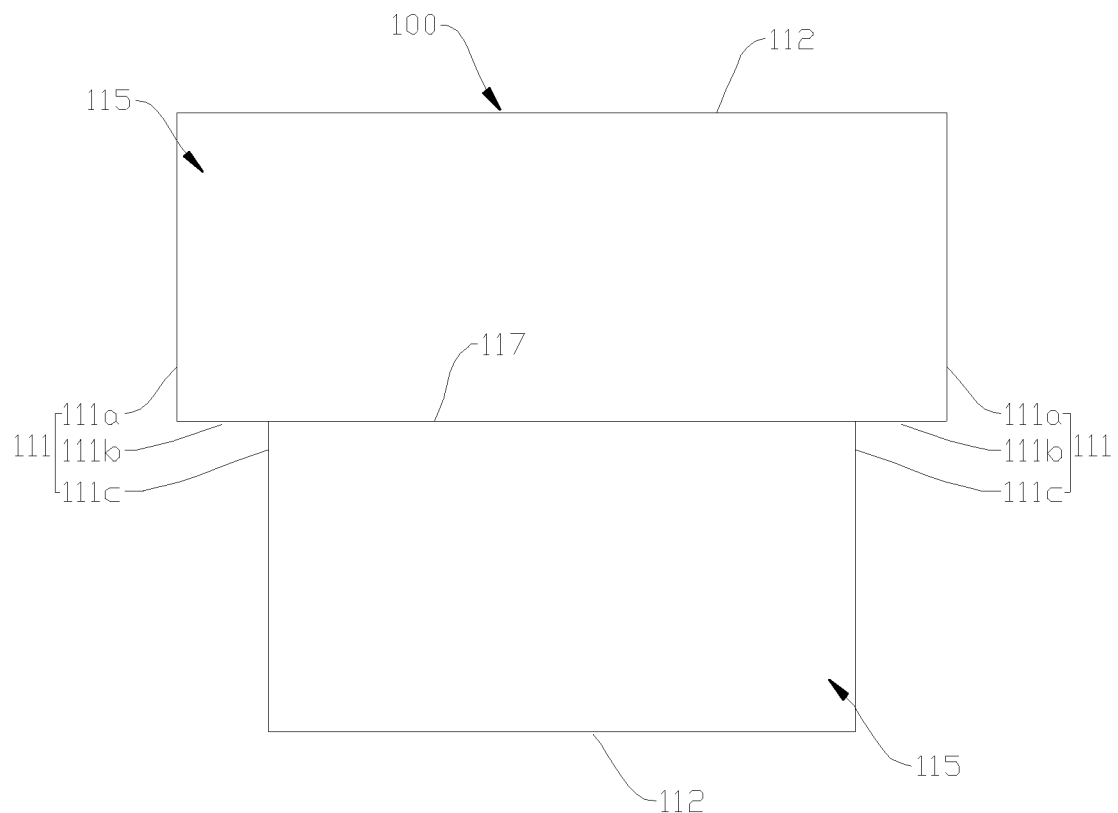
FIG. 7 is a diagram of a bracket provided by an embodiment of the present application.

In the embodiment shown in FIG. 7, the bracket 100 includes a pair of first beams 111, a pair of second beams 112, and a support beam 117. Where each first beam 111 includes a first section 111a, a second section 111b, and a third section 111c which are connected, the first section 111a and the second section 111b are connected at a right angle, and the second section 111b and the third section 111c are connected at a right angle. The support beam 117 is connected to the junction of the second section 111b and the third section 111c. The bracket 100 is provided with two subspaces 115.

Figure 8:
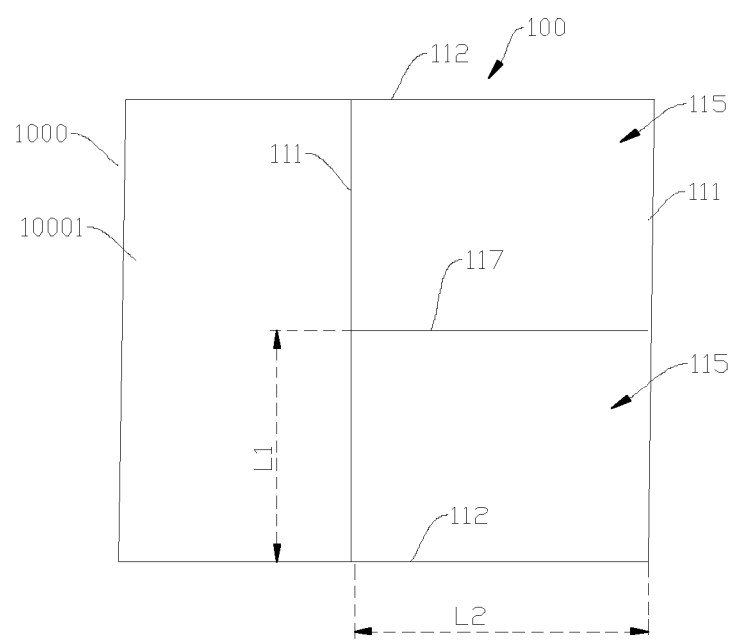
FIG. 8 is a diagram of a bracket provided by an embodiment of the present application.

In the embodiments shown in FIG. 8, the bracket 100 includes a pair of first beams 111, a pair of second beams 112, a support beam 117, and a U-shaped beam 1000. Where the pair of first beams 111, the pair of second beams 112 and the support beam 117 are connected in a shaped like two rectangles arranged next to each other, and the two rectangles share one side, with two subspaces 115. Two ends of the U-shaped beam 1000 are respectively connected to two ends of one of the first beams 111, and other space for accommodating the battery is defined between the U-shaped beam 1000 and the first beam 111, which is referred to herein as an alternative accommodating space 10001. In other words, in the bracket 100 provided by the embodiments of the present application, the battery accommodating space for installing the battery 200 may be defined by other structures on the bracket 100 in addition to the first beams 111 and the support beam 117.

In the embodiment shown in FIG. 8, the dimensions L1 of the two subspaces 115 in the length direction of the first beams 111 are equal, and the dimensions L2 of the two subspaces 115 in the arrangement direction of the pair of first beams 111 are equal. Therefore, the two subspaces 115 may be used for installing the batteries 200 with the same dimensions, and the dimension standardization of the batteries 200 is achieved.

To fix the bracket 100 to the power consumption device 1, in an embodiment of the present application, each first beam 111 is provided with a first connecting part 1113 for being connected to the power consumption device body 20 (such as, the vehicle body of the vehicle), and/or, the support beam 117 is provided with a second connecting part 1173 for being connected to the power consumption device body 20, and/or, each second beam 112 is provided with a third connecting part 1123 for being connected to the power consumption device body 20.

Figure 9:
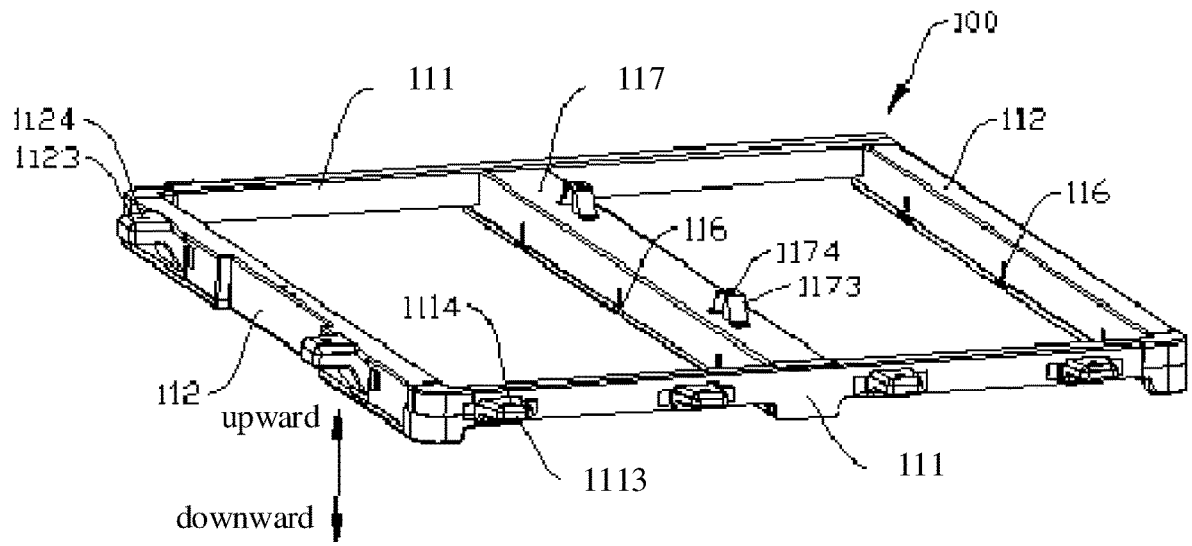
FIG. 9 is a diagram of a three-dimensional structure of a bracket provided by an embodiment of the present application from a top view angle.

It may be understood that, in the present application, the bracket 100 may be provided with one of the first connecting part 1113, the second connecting part 1173, and the third connecting part 1123, or may be provided with any two of the first connecting part 1113, the second connecting part 1173, and the third connecting part 1123, or may be simultaneously provided with three of the first connecting part 1113, the second connecting part 1173, and the third connecting part 1123. As shown in FIG. 9, the bracket 100 may be simultaneously provided with the first connecting part 1113, the second connecting part 1173, and the third connecting part 1123 to guarantee the reliability of connection of the bracket 100 to the vehicle body.

The first connecting part 1113, the second connecting part 1173 and the third connecting part 1123 may be of any appropriate structure. As shown in FIG. 9, in an embodiment of the present application, the first connecting part 1113 and the third connecting part 1123 may all be lugs, and the lugs extend outwards from outer side walls (away from the walls of the batteries 200) of the corresponding beams. The first connecting part 1113 is provided with a first installing hole 1114, and the third connecting part 1123 is provided with a third installing hole 1124. Fasteners respectively penetrate through the first installing hole 1114 and the third installing hole 1124 to connect the bracket 100 to the power consumption device body 20.

As shown in FIG. 9, in an embodiment of the present application, the second connecting part 1173 may be a nut structure with a second installing hole 1174; a threaded fastener penetrates through the second installing hole 1174 to connect the support beam 117 to the power consumption device body 20, thus achieving the threaded fixation of the bracket 100 to the power consumption device body 20.

In other embodiments of the present application, the second connecting part 1173 may be a latching tab, a buckle matched with the latching tab is arranged on the power consumption device body 20, and the second connecting part 1173 and the power consumption device body 20 are clamped and fixed.

Figure 10:
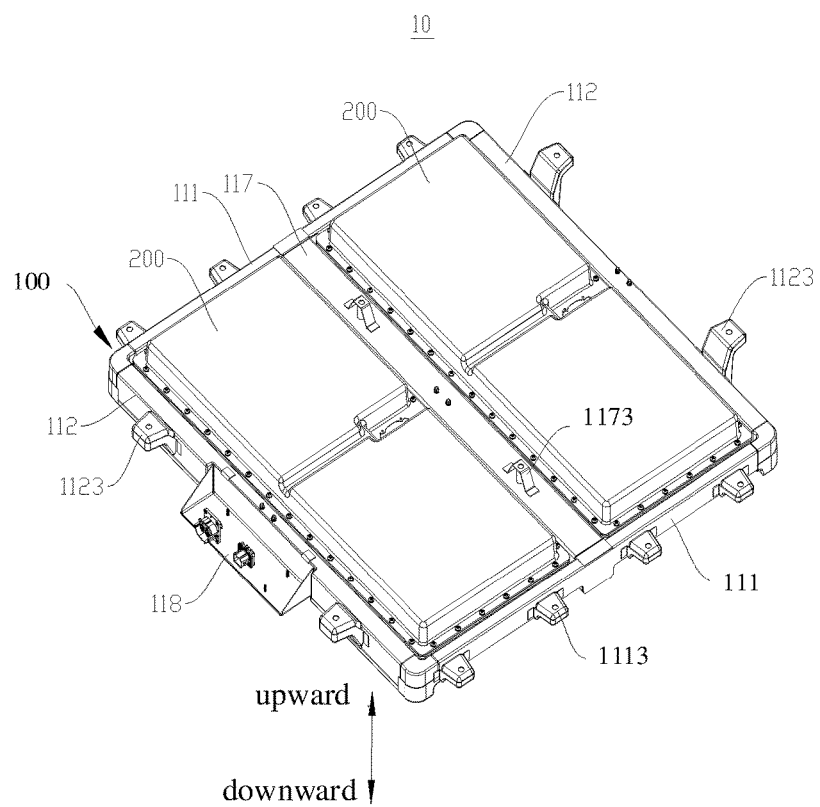
FIG. 10 is a diagram of a three-dimensional structure of a battery assembly provided by an embodiment of the present application from a top view angle.

As shown in FIG. 10, the battery assembly 10 includes a bracket 100 and two batteries 200 installed on the bracket 100. The bracket 100 is further provided with a bearing part 118 for installing an electric element, the electric element may be a connector for conveying electric energy of a plurality of batteries 200 to the power consumption device body 20.

It should be noted that, in the embodiments of the present application, the bracket 100 may not only be a planar bracket, but also be a stereoscopic bracket. That is, the plurality of subspaces 115 may not only be located in the same horizontal plane, but also be located in different horizontal planes. Therefore, when the vehicle is provided with installing faces at different horizontal planes, the bracket 100 may be well adapted to a structure of the vehicle, so that the installation between the bracket 100 and the vehicle body of the vehicle is more compact.

In addition, in the embodiments of the present application, the bracket 100 may be formed in any appropriate way. For example, the bracket 100 may be integrally formed (e.g., cast) or welded.

Figure 11:
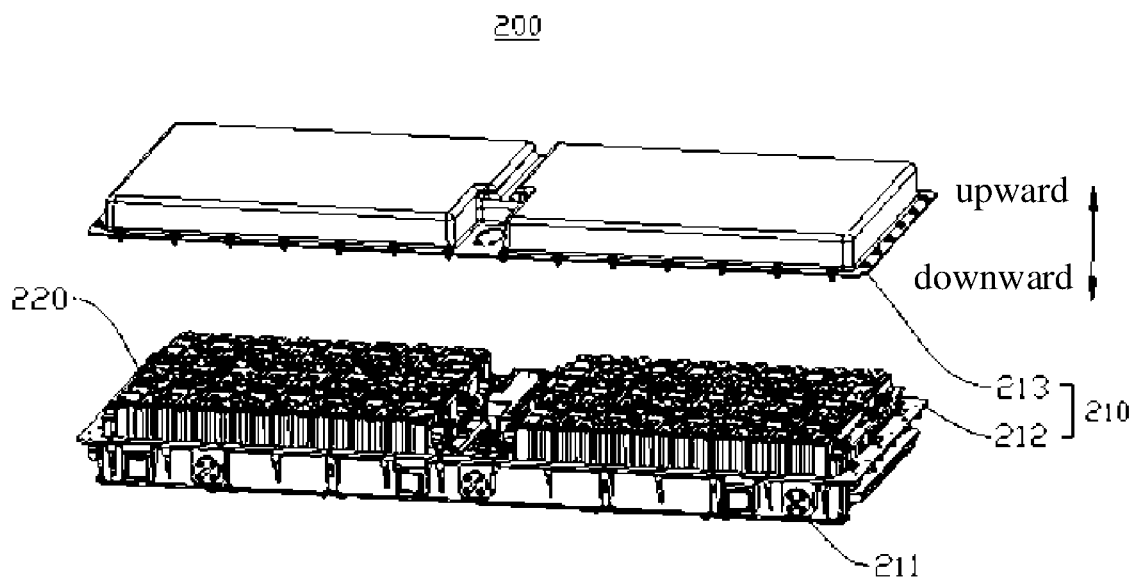
FIG. 11 is a diagram of an exploded structure of a battery of a battery assembly provided by an embodiment of the present application.

As shown in FIG. 11, a battery of the batteries 200 includes a sealed box body 210 and a battery cell 220 accommodated in the box body 210, and the box body 210 is provided with a locking part 211. Where the box body 210 may include a lower shell 212 and an upper cover 213, and the battery cell 220 is accommodated in a sealed cavity defined by the lower shell 212 and the upper cover 213.

Figure 12:
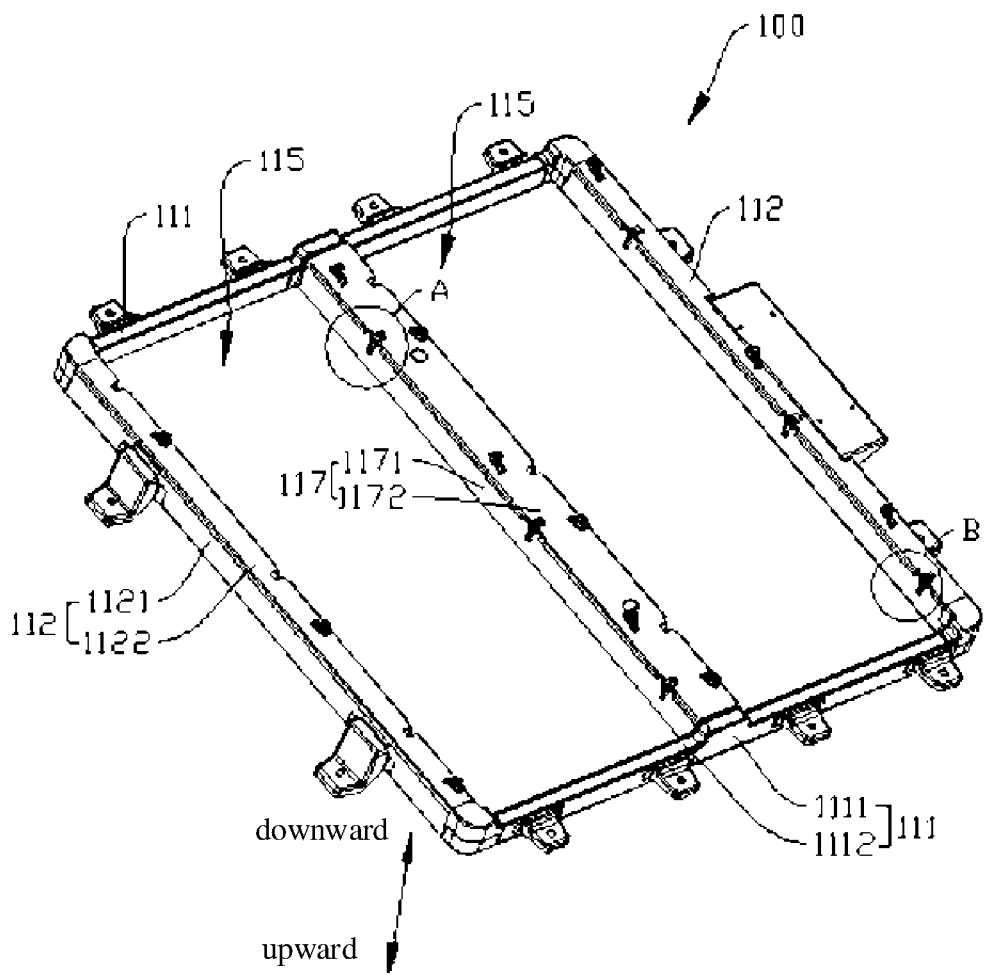
FIG. 12 is a diagram of a three-dimensional structure of a bracket provided by an embodiment of the present application from an upward view angle.
Figure 13:
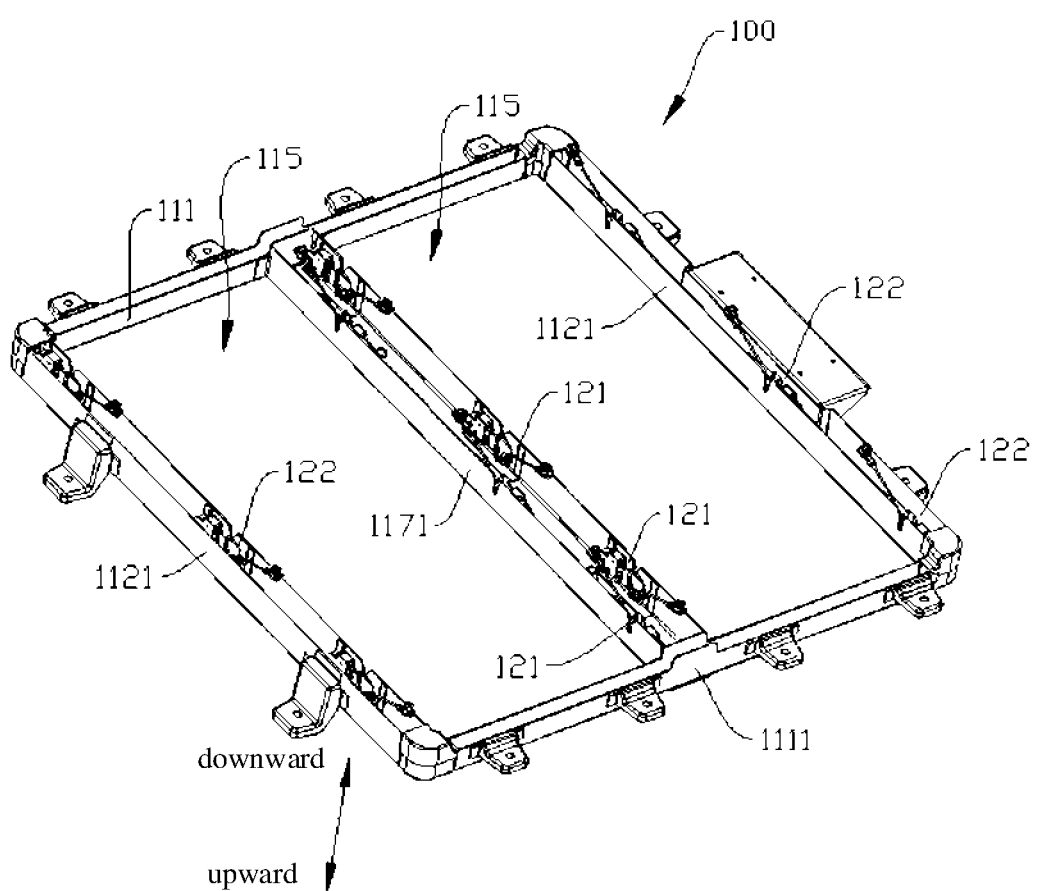
FIG. 13 is a diagram of a three-dimensional structure of a bracket provided by an embodiment of the present application from an upward view angle, where partial structure of the bracket is hidden.
Figure 14:
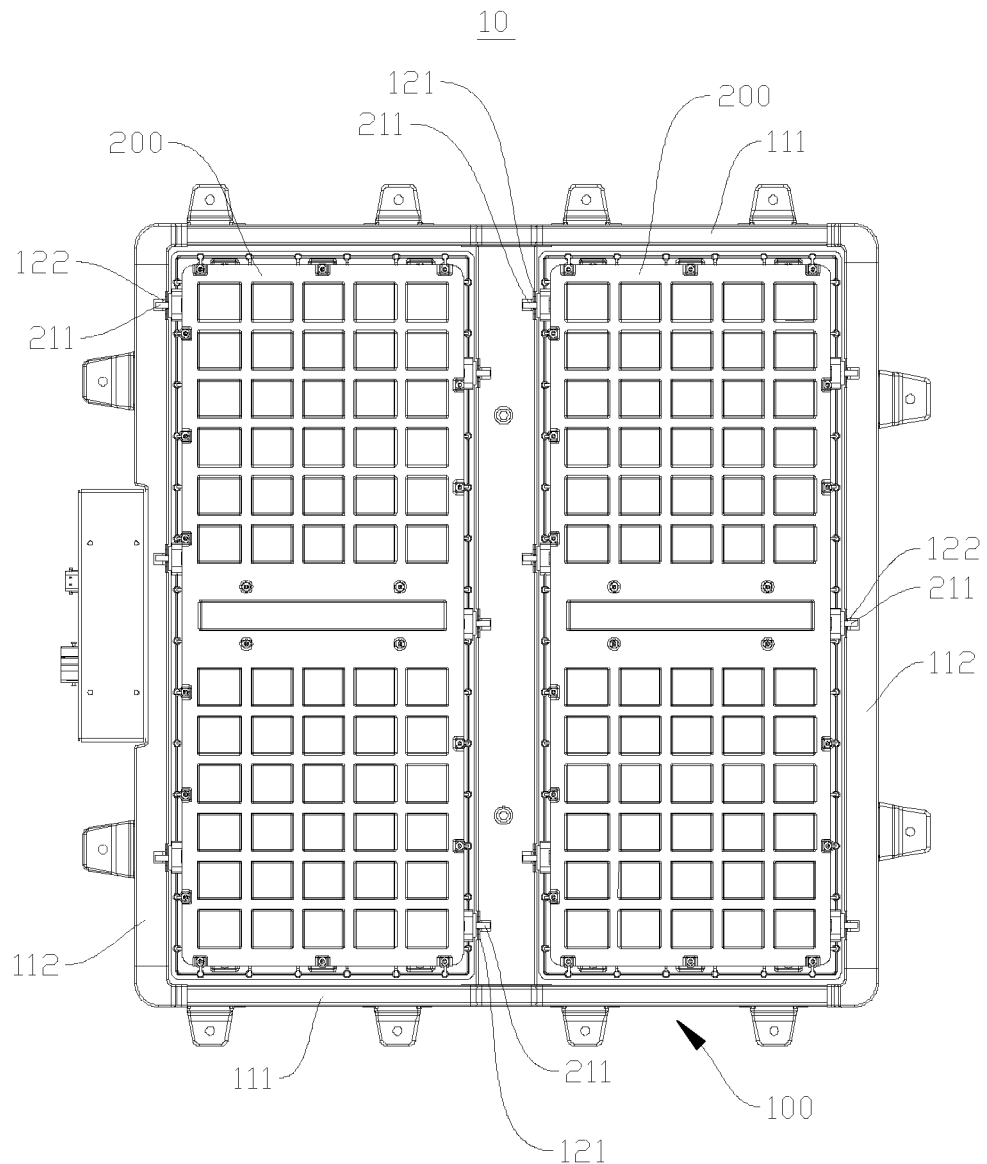
FIG. 14 is a diagram of a three-dimensional structure of a battery assembly provided by an embodiment of the present application from an upward view angle.
Figure 15:
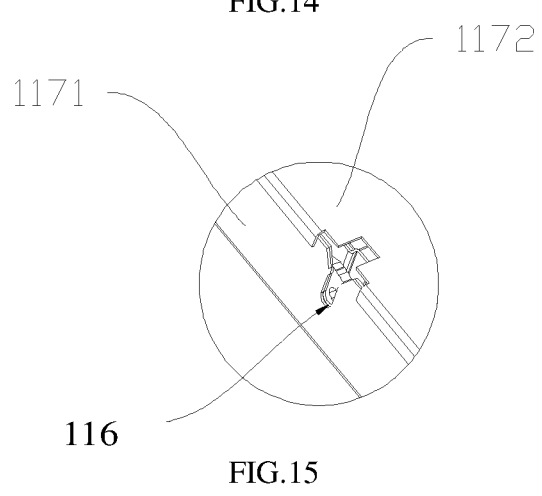
FIG. 15 is an enlarged view of a portion A in FIG. 12.

As shown in FIG. 12 to FIG. 14, in an embodiment of the present application, the bracket 100 is provided with a first locking mechanism 121, and the first locking mechanism 121 is installed on the support beam 117. The first locking mechanism 121 is configured to lock the box body 210 of the batteries 200 on the support beam 117 to achieve the fixation of the batteries 200 by the bracket 100, as shown in FIG. 14.

Specifically, the first locking mechanism 121 locks the battery 200 by locking the locking part 211 on the box body 210. If the battery 200 needs to be replaced, the locking to the locking part 211 of the battery 200 by the first locking mechanism 121 may be released, and then the battery 200 can be taken out. When a new battery 200 is placed in the accommodating space, the first locking mechanism 121 is used for locking a locking part 211 of the new battery 200.

The first locking mechanism 121 may be arranged at any appropriate position on the support beam 117. As shown in FIG. 13, in an embodiment of the present application, the first locking mechanism 121 may be arranged inside the support beam 117. The advantages of arranging the first locking mechanism 121 inside the support beam 117 are as follows: firstly, the space may be saved, and the batteries accommodating space of the bracket 100 is increased; secondly, the first locking mechanism 121 may be protected, so that the first locking mechanism 121 is prevented from being affected by an external environment, for example, the first locking mechanism is prevented from being corroded by rainwater and mud, and the locking reliability and unlocking reliability of the first locking mechanism 121 are guaranteed; and thirdly, due to the fact that the support beam 117 is of a hollow structure, the weight may be reduced, and the light weight of the bracket 100 is facilitated.

The number of the first locking mechanism 121 and the arrangement of the first locking mechanism 121 on the support beam 117 are not limited in the present application. As shown in FIG. 13, in an embodiment of the present application, each support beam 117 may be provided with two rows of first locking mechanisms 121, the two rows of first locking mechanisms 121 are arranged along the length direction of the first beams 111, and each row of first locking mechanisms 121 includes a plurality of first locking mechanisms 121 arranged along the arrangement direction of the pair of first beams 111. That is, the two rows of first locking mechanisms 121 are arranged along the arrangement direction of subspaces 115, and the two rows of first locking mechanisms 121 are respectively used for locking box bodies 210 of the batteries 200 accommodated in two adjacent subspaces 115. The two rows of first locking mechanisms 121 are arranged to lock the batteries 200 on the support beam 117, so that the installation strength of the support beam 117 to the batteries 200 is improved. Moreover, due to the fact that the two rows of first locking mechanisms 121 are arranged along the arrangement direction of two subspaces 115, two corresponding sides of the support beam 117 are uniformly stressed, and the support beam 117 is not prone to being damaged.

As shown in FIG. 13, in the support beam 117, the two rows of first locking mechanisms 121 are installed in the length direction of the support beam 117 in a misaligned manner, and thus the width of the support beam 117 is reduced on the premise that the support beam 117 meets the installation strength, and a space of the bracket 100 for installing the batteries is increased as much as possible.

As shown in FIG. 13, the bracket 100 further includes a second locking mechanism 122, and the second locking mechanism 122 is installed on the second beams 112 and used for locking the box bodies 210 of the batteries 200 on the second beams 112. Likewise, the second locking mechanism 122 locks the box body 210 by locking a locking part 211 of the box body 210.

In the embodiments of the present application, the bracket 100 may lock the batteries 200 only through one of the first locking mechanism 121 and the second locking mechanism 122. As the embodiments shown in the FIG. 13 and FIG. 14, the bracket 100 may lock the batteries 200 through the first locking mechanism 121 and the second locking mechanism 122 simultaneously, thus sufficiently guaranteeing the reliability of locking the batteries 200 by the bracket 100.

As shown in FIG. 13, the second locking mechanism 122 is arranged inside the second beam 112. The advantages of arranging the second locking mechanism 122 inside the second beam 112 are as follows: firstly, the space may be saved, and the batteries accommodating space of the bracket 100 is increased; secondly, the second locking mechanism 122 may be protected, so that the second locking mechanism 122 is prevented from being affected by an external environment, for example, the first locking mechanism is prevented from being corroded by rainwater and mud, and the locking reliability and unlocking reliability of the second locking mechanism 122 is guaranteed; and thirdly, due to the fact that the second beam 112 is of a hollow structure, the weight may be reduced, and the light weight of the bracket 100 is facilitated.

The specific structure of the support beam 117 is not limited in the present application. As shown in FIG. 12 and FIG. 13, in an embodiment of the present application, the support beam 117 may include a support beam body 1171 and a support beam cover body 1172, the cross section of the support beam body 1171 is U-shaped, and the support beam body 1171 is provided with an opening, the first locking mechanism 121 is arranged inside the support beam body 1171, and the support beam cover body 1172 covers the opening of the support beam body 1171. The support beam body 1171 is of a U-shaped design, and the structure is relatively simple while guaranteeing the providing of an installing space for the first locking mechanism 121. The opening of the support beam body 1171 is downward.

It should be noted that the downward herein refers that the opening is towards the gravity direction when the bracket 100 is installed on the power consumption device body 20. Therefore, after the bracket 100 is installed to the vehicle body, due to the fact that the opening of the support beam body 1171 is downward, when the first locking mechanism 121 or other mechanisms arranged in the support beam body 1171 fails, the first locking mechanism 121 or other mechanisms may be conveniently maintained or replaced.

Likewise, the specific structure of the second beam 112 is not limited in the present application. As shown in FIG. 12 and FIG. 13, in an embodiment of the present application, each second beam 112 may include a second beam body 1121 and a second beam cover body 1122, the cross section of the second beam body 1121 is U-shaped, and the second beam body 1121 is provided with an opening, the second locking mechanism 122 is arranged inside the second beam body 1121, and the second beam cover body 1122 covers the opening of the second beam body 1121. The second beam body 1121 is of a U-shaped design, and the structure is relatively simple while guaranteeing the providing of an installing space for the second locking mechanism 122.

The opening of the second beam body 1121 is downward. It should be noted that the downward herein refers that the opening is towards the gravity direction when the bracket 100 is installed on the power consumption device body 20. Therefore, after the bracket 100 is installed to the vehicle body, due to the fact that the opening of the second beam body 1121 is downward, when the second locking mechanism 122 or other mechanisms arranged in the second beam body 1121 fails, the second locking mechanism 122 or other mechanisms may be conveniently maintained or replaced.

As shown in FIG. 12 and FIG. 13, each first beam 111 may include a first beam body 1111 and a first beam cover body 1112, the cross section of the first beam body 1111 is U-shaped, and the first beam body 1111 is provided with an opening, and the first beam cover body 1112 covers the opening of the first beam body 1111. The opening of the first beam body 1111 is downward. The advantages of such split arrangement of the first beams 111 are similar to that of the split design of the support beam 117 and the second beams 112, and are not repeated here.

In the present application, in addition to the first locking mechanism 121 and the second locking mechanism 122, the locking mechanism may include a third locking mechanism, which is not limited in the present application. For example, the third locking mechanism may be arranged on the first beam 111 when the third locking mechanism is provided.

In the embodiments of the present application, the first locking mechanism 121 and the second locking mechanism 122 may adopt the same structure, or may adopt different structures. To simplify the structure of the bracket 100 and reduce the cost, in an embodiment of the present application, the first locking mechanism 121 and the second locking mechanism 122 adopt the same structure.

One objective of the present application is to achieve quick replacement of the batteries 200. The locking mechanism of the bracket in the related art is complex in structure, and the locking and unlocking processes are complex, so that the batteries 200 are not easy to replace quickly.

To this end, as shown in FIG. 15 to FIG. 18, the support beam 117 is provided with a channel 116 extending along the gravity direction. The channel 116 extends to a lower surface of the support beam 117 to make a locking part 211 arranged on the box body 210 be capable of entering and exiting the channel 116. Where the first locking mechanism 121 is configured to lock the locking part 211 when the locking part 211 moves upwards to a preset position of the channel 116; and the first locking mechanism 121 is configured to release the locking to the locking part 211, so that the locking part 211 moves downwards under the action of gravity of the batteries 200 to be separated from the channel 116.

Based on the above solutions, in the locking and unlocking processes of the battery 200, the battery 200 only needs to move upwards or downwards in the channel 116, and there is no adjust the battery 200 in other directions (e.g. front and rear of the vehicle). In particular, when unlocking the battery 200, after the first locking part 121 releases the locking to the locking part 211, the locking part 211 of the battery 200 can be separated from the channel 116 under the action of gravity of the battery 200, the locking and the unlocking of the battery 200 are relatively convenient and efficient, the efficiency of installing and detaching the battery 200 is improved, and the quick replacement of the battery 200 pack is achieved. In addition, for the support beam 117, only the channel 116 needs to be provided thereon to be matched with the locking part 211, excessive design is not required, and a structure of the support beam 117 is simplified.

Figure 16:
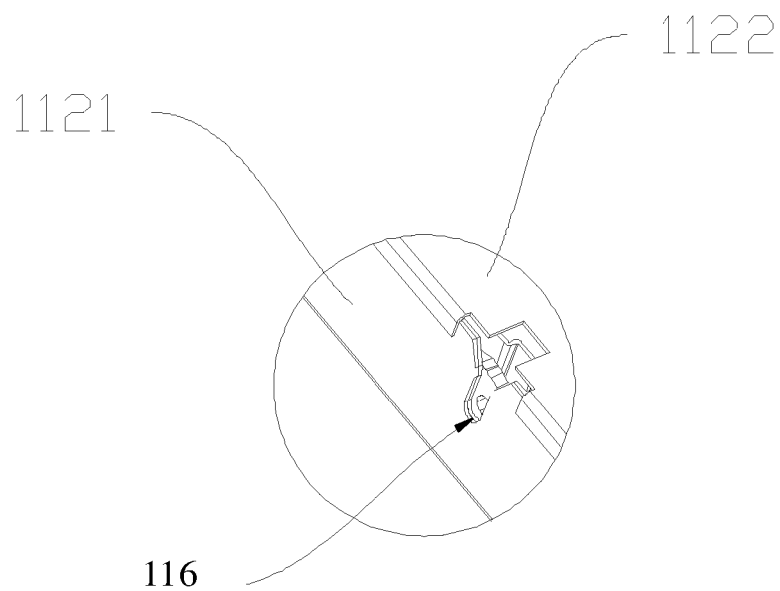
FIG. 16 is an enlarged view of a portion B in FIG. 12.
Figure 17:
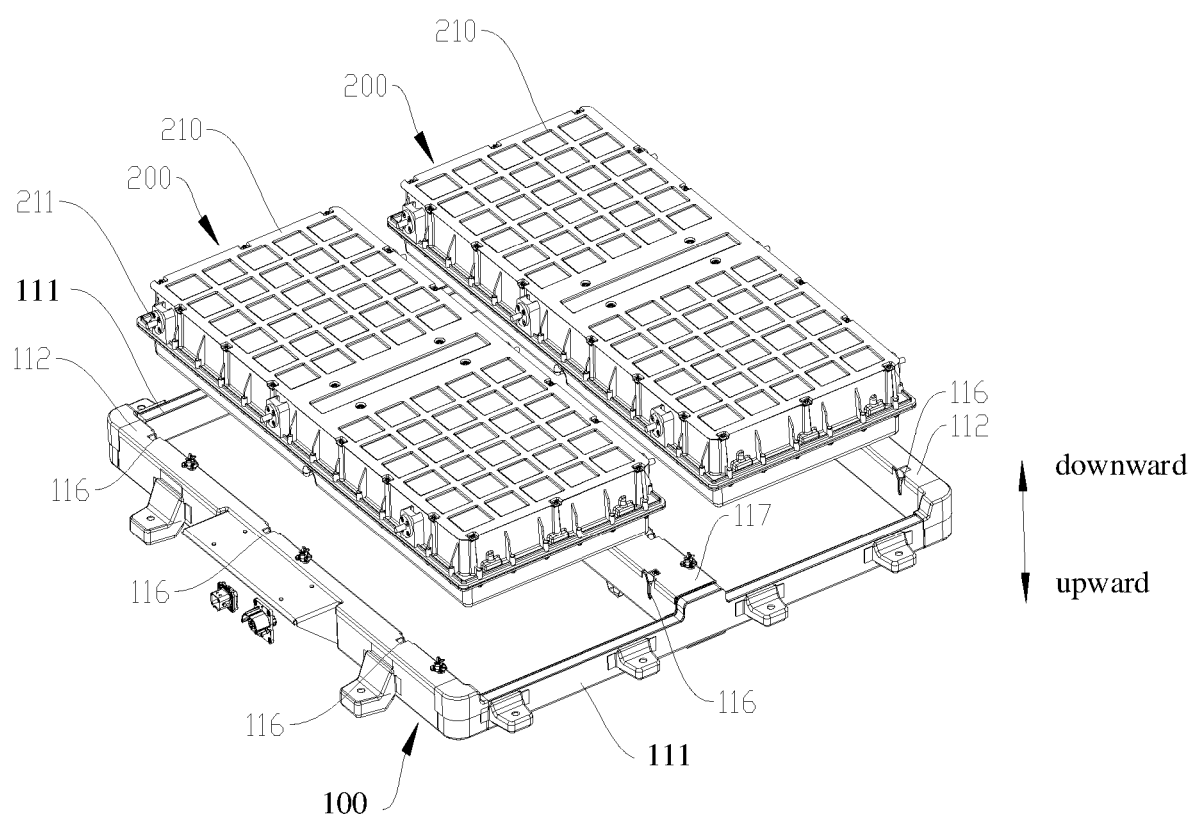
FIG. 17 is an upward exploded view of a battery assembly provided by an embodiment of the present application.
Figure 18:
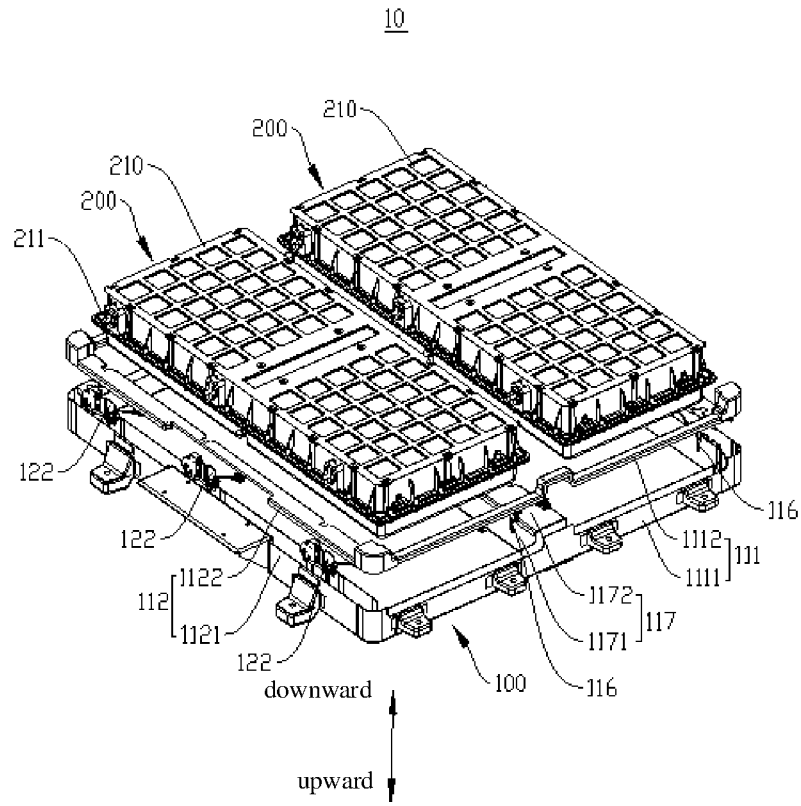
FIG. 18 is an exploded view of a battery assembly provided by an embodiment of the present application from an upward view angle, where a first beam body and a first beam cover body are separated, and a second beam body and a second beam cover body are separated.

As shown in FIG. 16 to FIG. 18, each second beam 112 is provided with a channel 116 extending along the gravity direction. The channel 116 extends to a lower surface of the second beam 112 to make a locking part 211 arranged on the box body 210 be capable of entering and exiting the channel 116. Where the second locking mechanism 122 is configured to lock the locking part 211 when the locking part 211 moves upwards to a preset position of the channel 116; and the second locking mechanism 122 is configured to release the locking to the locking part 211, so that the locking part 211 moves downwards under the action of gravity of the batteries 200 to be separated from the channel 116.

Based on the above solutions, in the locking and unlocking processes of the battery 200, the battery 200 only needs to move upwards or downwards in the channel 116, and there is no adjust the battery 200 in other directions (e.g. front and rear of the vehicle). In particular, when unlocking the battery 200, after the second locking mechanism 122 releases the locking to the locking part 211, the locking part 211 of the battery 200 can be separated from the channel 116 under the action of gravity of the battery 200, the locking and the unlocking of the battery 200 are relatively convenient and efficient, the efficiency of installing and detaching the battery 200 is improved, and the quick replacement of the battery 200 pack is achieved. In addition, for the second beam 112, only the channel 116 needs to be provided thereon to be matched with the locking part 211, excessive design is not required, and a structure of the second beam 112 is simplified.

Where the preset position of the channel 116 may be any appropriate position in the extending direction of the channel 116, which is not limited in the present application.

In the embodiments of the present application, the support beam 117 is provided with a plurality of channels 116 and a plurality of first locking mechanisms 121, and the plurality of first locking mechanisms 121 are in one-to-one correspondence with the plurality of channels 116.

In the embodiments of the present application, second beam 112 is provided with a plurality of channels 116 and a plurality of second locking mechanisms 122, and the plurality of second locking mechanisms 122 are in one-to-one correspondence with the plurality of channels 116.

To save time for locking and unlocking the batteries 200, the replacement efficiency of the batteries 200 is improved. Optionally, in an embodiment of the present application, the plurality of first locking mechanisms 121 are configured to lock or unlock synchronously. The plurality of second locking mechanisms 122 are configured to lock or unlock synchronously.

In the embodiments of the present application, the first locking mechanisms 121 and the second locking mechanisms 122 may be any appropriate structure. Taking the first locking mechanism 121 as an example, as shown in the FIG. 19 to FIG. 21, in the embodiments of the present application, the first locking mechanism 121 may include a first locking member 123 and a second locking member 124. The first locking member 123 is rotatably installed on the support beam 117.

The second locking member 124 is configured to prevent the first locking member 123 from rotating when the first locking member 123 rotates to a locking position, thus keeping the first locking member 123 at the locking position. The first locking member 123 is configured to prevent the locking part 211 at the preset position of the channel 116 from moving downwards when located at the locking position.

As such, after the locking part 211 of the battery 200 moves to the preset position of the channel 116, the locking part 211 may be locked in the channel 116 through the matching of the first locking member 123 and the second locking member 124, thus locking the battery 200. When needing to unlock, the limiting to the first locking member 123 by the second locking member 124 may be firstly released, thus making the first locking member 123 rotate to an unlocking position from the locking position to unlock the battery 200.

The first locking member 123 and the second locking member 124 may be of any appropriate structure, as long as the locking and unlocking to the locking part 211 of the battery 200 may be smoothly achieved.

Figure 19:
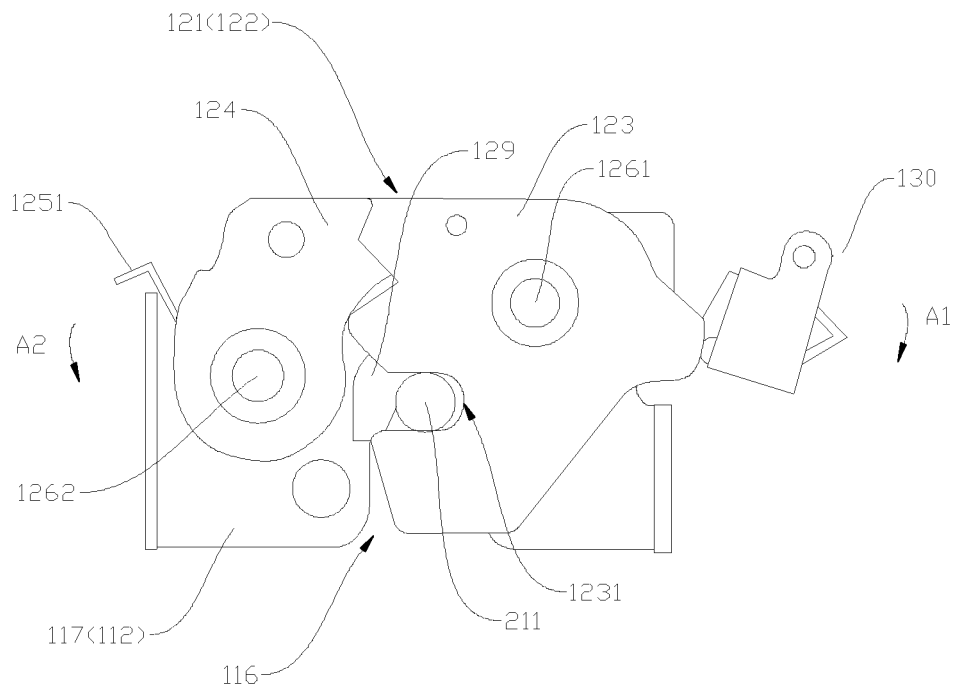
FIG. 19 is a front view that a first/second locking mechanism of a bracket locks a locking part of a battery provided by an embodiment of the present application.
Figure 20:
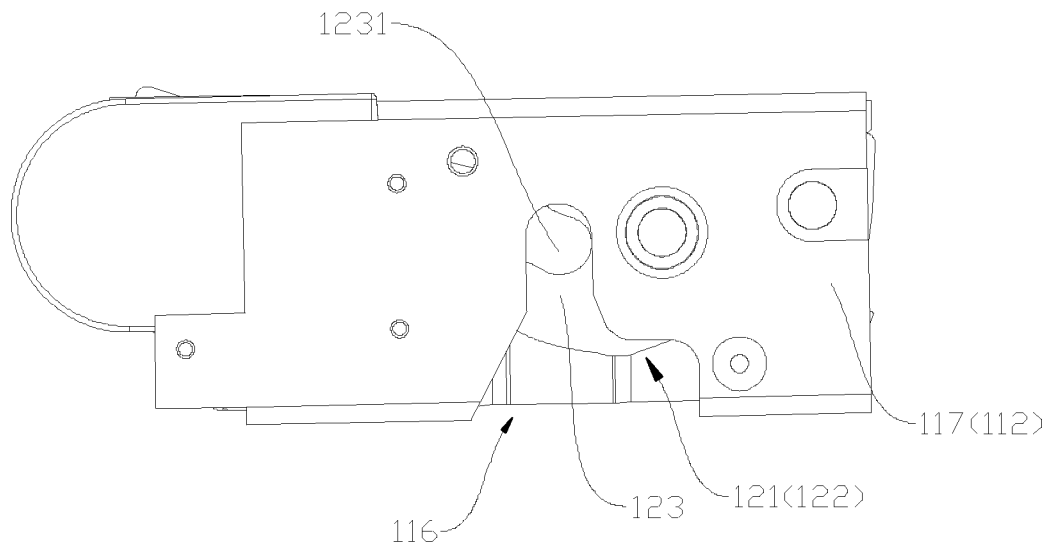
FIG. 20 is a rear view that a first/second locking mechanism of a bracket locks a locking part of a battery provided by an embodiment of the present application.

As shown in FIG. 19 and FIG. 20, in an embodiment of the present application, the first locking member 123 may be a ratchet, and the second locking member 124 may be a pawl. The ratchet is configured to be driven by the locking part 211 to move rotate along the first direction A1 in upward movement process of the locking part 211. The pawl is configured to mesh with the ratchet when the locking part 211 moves upwards to the preset position of the channel 116, thus preventing the ratchet from rotating, for example, the ratchet is prevented from rotating along the second direction A2 opposite to the first direction A1, thereby locking the locking part 211 in the channel 116 by the ratchet, and achieving the locking to the battery 200.

The ratchet is rotatably installed on the support beam 117 through a first rotating shaft 1261, and the pawl is rotatably installed on the support beam 117 through a second rotating shaft 1262.

In the embodiments, the matching of the ratchet and the pawl may guarantee the reliability of locking the locking part 211, and the reliability of installing the batteries 200 on the bracket 100 is guaranteed. Moreover, when the batteries 200 need to be unlocked, the pawl is separated from the ratchet, and the operation is convenient and efficient.

The ratchet may be provided with one ratchet tooth or a plurality of ratchet teeth. When the ratchet is provided with the plurality of ratchet teeth, the locking part 211 of the batteries 200 may be provided with a plurality of locking positions in the channel 116 of the bracket 100 by matching the ratchet teeth at different positions with the pawl.

As shown in FIG. 19 and FIG. 20, the ratchet is provided with a clamping port 1231 for clamping the locking part 211, so as to facilitate the limit of the locking part 211 of the battery 200.

When the battery 200 is not installed on the bracket 100, the clamping port 1231 of the ratchet may be towards the direction of gravity. In the process that the locking part 211 moves upwards along the channel 116, the locking part 211 enters the clamping port 1231. When the locking part 211 continues to move upwards, the locking part 211 abuts against a side wall of the clamping port 1231 to make the ratchet rotate. After the clamping port 1231 is rotated to a certain position, for example, when the clamping port 1231 is rotated to the horizontal direction shown in FIG. 15, if the pawl locks the ratchet at the moment, the clamping port 1231 may lock the locking part 211 in the vertical direction.

To guarantee the meshing reliability of the pawl and the ratchet, optionally, as shown in FIG. 19, the first locking mechanism 121 may further include a first elastic member 1251, the first elastic member 1251 is acted on the pawl to make the pawl abut against the ratchet. Therefore, on the one hand, when the ratchet rotates to the locking position, the pawl may move immediately to be locked with the ratchet under the action of the first elastic member 1251, thus quickly locking the locking part 211. On the other hand, under the action of an elastic force of the first elastic member 1251, the pawl may remain meshed with the ratchet, thus ensuring the reliability of locking the battery 200 by the first locking mechanism 121.

As shown in FIG. 19, the first elastic member 1251 is a torsional spring, the second rotating shaft 1262 may be sleeved with the torsional spring, one end of the torsional spring is connected to the second locking member 124, and the other end may be connected to a driving member (not shown).

As shown in FIG. 19, in an embodiment of the present application, the bracket 100 may further be provided with a position sensor 130 for detecting a position of the first locking member 123 (i.e. the ratchet), thus judging whether the locking/unlocking to the battery 200 is in place.

As shown in FIG. 19 and FIG. 20, the first locking mechanism 121 may further include an elastic cushion 129, the elastic cushion 129 is arranged at an upper end of the channel 116 to buffer upward movement of the locking part 211.

Figure 21:
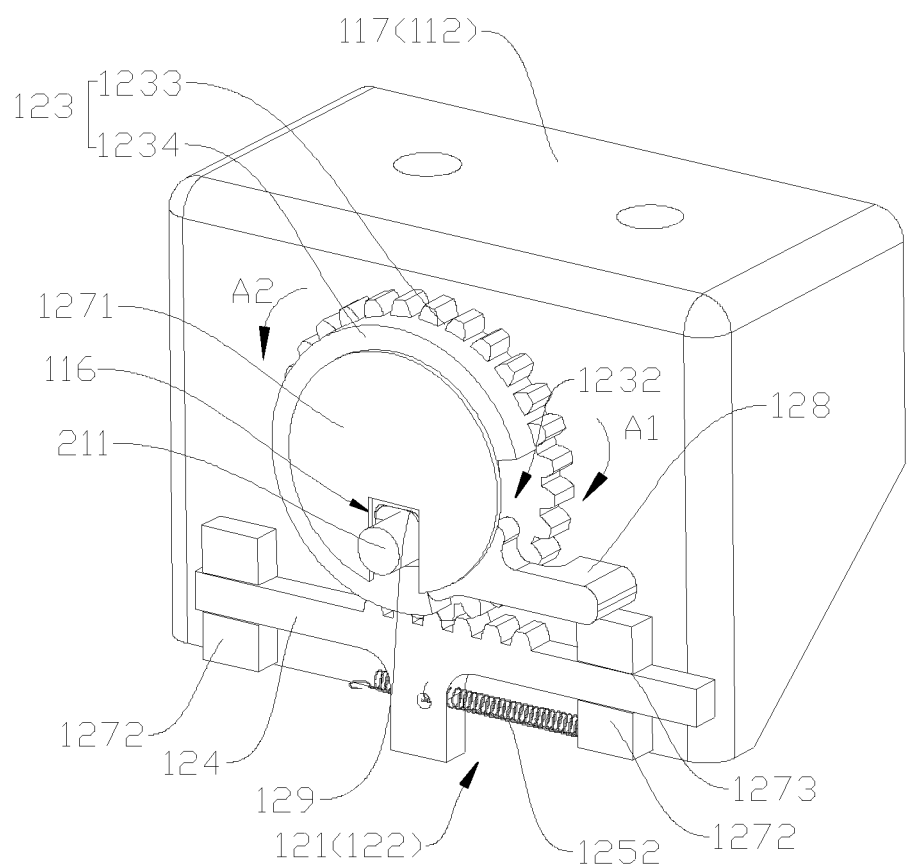
FIG. 21 is a diagram of a three-dimensional structure that a first/second locking mechanism of a bracket locks a locking part of a battery provided by another embodiment of the present application.

As shown in FIG. 21, in another embodiment of the present application, the first locking member 123 is provided with a clearance part 1232 for the locking part 211 to penetrate out. The second locking member 124 is configured to drive the first locking member 123 to rotate, thus making the clearance part 1232 to be misaligned with or communicated with the channel 116 in the direction of gravity to lock or unlock the locking part 211.

As shown in FIG. 21, in the embodiment, when the first locking member 123 is in an initial state, the clearance part 1232 thereof is misaligned with the channel 116 in the gravity direction. If the battery needs to be locked, firstly, the first locking member 123 may be driven by the second locking member 124 to rotate in the first direction A1 to a position at which the clearance part 1232 of the first locking member 123 is communicated with the channel 116, thus making the locking part 211 of the battery 200 enter the channel 116 through the clearance part 1232 until the locking part 211 is located at the preset position in the channel 116. Afterwards, the first locking member 123 is driven by the second locking member 124 to rotate in the second direction A2 to a position at which the clearance part 1232 of the first locking member 123 is misaligned with channel 116. As such, the first locking member 123 may block the locking part 211 in the channel 116 to lock the locking part 211, thus locking the battery 200. If the battery 200 needs to be unlocked, the first locking member 123 may be driven by the second locking member 124 to rotate in the first direction A1 to a position at which the clearance part 1232 of the first locking member 123 is communicated with the channel 116. As such, the battery 200 may be separated from the bracket 100 under the own gravity. In the embodiment, the locking and the unlocking of the battery 200 are equally convenient and efficient.

As shown in FIG. 21, the first locking member 123 is a gear, and the gear is rotatably installed on the support beam 117. The channel 116 is at least partially located in a center hole of the gear. The second locking member 124 is a rack meshed with the gear, and is movably installed on the support beam 117. The rack is configured to drive the gear to rotate to make the clearance part 1232 be communicated with or misaligned with the channel 116 in the gravity direction, thus unlocking or locking the locking part 211.

When the clearance part 1232 of the gear (an opening for communicating the gear center hole with a peripheral wall) is misaligned with the channel 116, an inner wall of the center hole of the gear prevents the locking part 211 of the battery 200 from moving downwards from the preset position of the channel 116 to achieve locking of the battery 200. When the clearance part 1232 of the gear is communicated with the channel 116, the locking part 211 of the battery 200 may move downwards from the preset position of the channel 116 to achieve unlocking of the battery 200. The reliability of gear and rack transmission is high, and the reliability of locking and unlocking of the battery 200 is guaranteed.

As shown in FIG.21, in an embodiment of the present application, the support beam 117 is provided with a boss 1271, and the boss 1271 is rotatably sleeved with the gear, so as to facilitate the gear to be rotatably installed on the support beam 117. The channel 116 is arranged at an end face of the boss 1271, and the channel 116 extends to a peripheral surface of the boss 1271. As such, in the process that the gear rotates around the boss 1271, the clearance part 1232 of the gear may be communicated with the channel 116, thus avoiding the locking part 211 of the battery 200; or the clearance part 1232 of the gear may be misaligned with the channel 116, the inner wall of the center hole of the gear is used for blocking a lower end of a channel, thus locking the locking part 211.

In the embodiment shown in FIG. 21, the rack is configured to move between a first position and a second position, the gear is configured to lock the locking part 211 when the rack moves to the first position, and to release the locking to the locking part 211 when the rack moves to the second position. The first locking mechanism 121 further includes a second elastic member 1252, the second elastic member 1252 is connected to the rack and used for driving the rack to move to the first position from the second position. Here, the second elastic member 1252 is used for keeping the rack at the first position, thus keeping the gear at the locking position.

As shown in FIG. 21, the second elastic member 1252 may be a spring. When the rack is located at the first position, the spring is in a free extension state.

To guarantee the rack to smoothly move along a preset path. As shown in FIG. 21, the support beam 117 is provided with two oppositely arranged installing blocks 1272, guide grooves 1273 are provided on the corresponding positions of the two installing blocks 1272, and two ends of the rack are respectively installed in the corresponding guide grooves 1273 respectively. The two guide grooves 1273 are used for guiding the rack to move along the preset path, the smooth rotation of the gear is remained, thus guaranteeing the reliability of locking and unlocking the battery 200.

As shown in FIG. 21, the first locking mechanism 121 further includes a limiting member 128, the limiting member 128 is installed on the first locking mechanism 121, the limiting member 128 is configured to abut against with the gear when the gear rotates to the locking position along the second direction A2, thus preventing the gear from continuously rotating along the second direction A2. The reliability of locking the battery 200 is guaranteed by arranging the limiting member 128.

As shown in FIG. 21, the first locking mechanism 121 may further include an elastic cushion 129, the elastic cushion 129 is arranged at an upper end of the channel 116 to buffer upward movement of the locking part 211.

As shown in FIG. 21, in an embodiment of the present application, the gear may include a first annular part 1233 and a second annular part 1234, where the first annular part 1233 and the second annular part 1234 are axially arranged along the center hole of the gear. The periphery of the first annular part 1233 is provided with teeth meshed with the rack, and the second annular part 1234 is provided with an opening to form the clearance part 1232. In the process that the gear rotates around the boss 1271, the opening on the second annular part 1234 may be communicated with or misaligned with the channel 116 on the support beam 117 to unlock or lock the battery 200.

By dividing the gear into the first annular part 1233 and the second annular part 1234, the gear may be provided with circumferentially continuous teeth while the clearance part 1232 is provided on the gear.

It should be noted that, in other embodiments of the present application, an opening may be directly provided on the first annular part 1233 of the gear to form the clearance part 1232. Thus the second annular part 1234 is omitted.

In addition, in other embodiments of the present application, the first locking member 123 and the second locking member 124 may both be gears, both rotatably installed on the support beam 117 and meshed for rotation. Where the first locking member 123 is provided with the clearance part 1232. Therefore, the second locking member 124 may drive the first locking member 123 to rotate during rotation, so that the clearance part 1232 is communicated with or misaligned with the channel 116 in the direction of gravity to unlock or lock the locking part 211.

It should be understood that, in other embodiments of the present application, the first locking mechanism 121 may further include an installing base, and a gap may be provided on the installing base at a position corresponding to the channel 116 of the bracket body 110. The first locking member 123 and the second locking member 124 may be firstly installed on the installing base, and then the installing base is installed in the support beam 117 together with the first locking member 123 and the second locking member 124.

Figure 22:
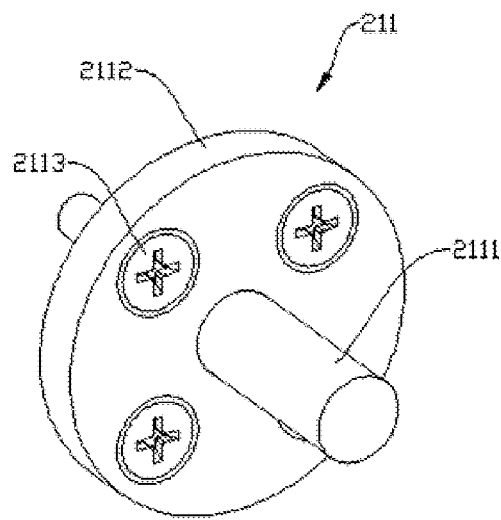
FIG. 22 is a diagram of a three-dimensional structure of a locking part of a battery provided by an embodiment of the present application.
Figure 23:
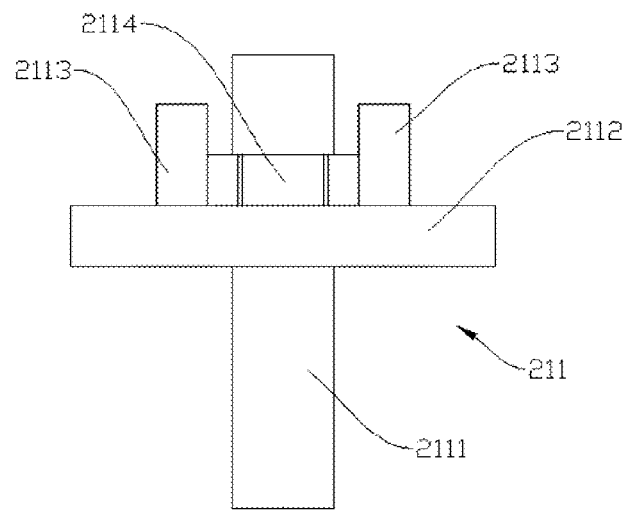
FIG. 23 is a top view of a locking part of a battery provided by an embodiment of the present application.

As shown in FIG.22 and FIG.23, in an embodiment of the present application, the locking part 211 of the battery 200 may include a locking pin 2111, one end of the locking pin 2111 is connected to a shell of the box body 210, and the other end is used for being matched with the channel 116.

As shown in FIG. 22 and FIG. 23, the locking part 211 may further include a flange 2112, the flange 2112 is installed on the shell of the box body 210 through a locking screw 2113, the locking pin 2111 is provided with a threaded section, and one end of the locking pin 2111 sequentially penetrates through the flange 2112 and a side wall of the support beam 117 (not shown) and is locked to the support beam 117 through a locking nut 2114.

In the embodiments of the present application, a specific structure of the second locking mechanism 122 may be same as the structure of the first locking mechanism 121, which is not repeated here.

In an embodiment of the present application, the bracket 100 may further includes a first driving member and a second linkage member, the first linkage member is connected to each second locking member 124 in the plurality of first locking mechanisms 121, and the first driving member is configured to drive each second locking member 124 in the plurality of first locking mechanisms 121 to act synchronously through the first linkage member, thus making the plurality of first locking mechanisms 121 unlock synchronously. As such, the plurality of first locking mechanisms 121 may share the first driving member and the first linkage member, and compared with the solution that each of the first locking mechanisms 121 is provided with one first driving member, the solution of sharing the first driving member in the embodiment is beneficial to reducing the cost and simplifying the structure of the bracket 100.

In an embodiment of the present application, the bracket 100 may further includes a second driving member and a second linkage member, the second linkage member is connected to each second locking member 124 in the plurality of second locking mechanisms 122, the second driving member is configured to drive each second locking member 124 in the plurality of second locking mechanisms 122 to act synchronously through the second linkage member, thus make the plurality of second locking mechanisms 122 unlock synchronously. As such, the plurality of second locking mechanisms 122 may share the driving member and the linkage member, and compared with the solution that each of the second locking mechanisms 122 is provided with one second driving member, the solution of sharing the second driving member in the embodiment is beneficial to reducing the cost and simplifying the structure of the bracket 100.

The foregoing is merely optional embodiments of the present application and are not intended to limit the present application, and for those skilled in the art, various modifications and variations may be made to present application. Any modifications, equivalents, improvements, etc., made within the spirit and principles of the present application all shall be included within the scope of the present application.

What is claimed is:

1. A bracket for being connected to batteries and a power consumption device body, a battery of the batteries comprising a box body and a battery cell accommodated in the box body, wherein the bracket comprises:
   a pair of first beams, the pair of first beams being oppositely arranged;
   at least one support beam, wherein each support beam is connected to the pair of first beams, a space between the pair of first beams is separated by the at least one support beam into a plurality of subspaces, the plurality of subspaces are arranged along a length direction of the first beams, each subspace is configured to accommodate at least one of the batteries, two adjacent subspaces are separated by each support beam, and each support beam is configured to install the box bodies of the batteries accommodated in the two adjacent subspaces;
   a first locking mechanism, and the first locking mechanism is installed on a support beam of the at least one support beam and is configured to lock the box bodies of the batteries on the support beam;
   wherein the support beam is provided with a first channel extending along a gravity direction, and the first channel extends to a lower surface of the support beam to make a first locking part arranged in the box body be capable of entering and exiting the first channel, so that a direction of a movement of the first locking part is configured to be along the gravity direction rather than a horizontal direction perpendicular to the gravity direction;
   the first locking mechanism is configured to lock the first locking part when the first locking part moves upwards to a preset position of the first channel; and the first locking mechanism is configured to release the locking of the first locking part, so that the first locking part moves downwards under the action of gravity of the battery to be separated from the first channel.

2. The bracket according to claim 1, wherein the first locking mechanism is arranged inside the support beam.

3. The bracket according to claim 2, wherein the support beam comprises a support beam body and a support beam cover body, a cross section of the support beam body is U-shaped, and the support beam body is provided with a first opening; the first locking mechanism is arranged inside the support beam body, and the support beam cover body covers the first opening of the support beam body.

4. The bracket according to claim 3, wherein the first opening of the support beam body is downward.

5. The bracket according to claim 1, wherein each support beam is provided with two rows of the first locking mechanism, and the two rows of the first locking mechanism are arranged along the length direction of the first beams; and each row of the first locking mechanism comprises a plurality of the first locking mechanism arranged along the arrangement direction of the pair of first beams.

6. The bracket according to claim 1, wherein the bracket further comprises a pair of second beams, the pair of second beams are oppositely arranged, each second beam is connected to the pair of first beams, the at least one support beam is located between the pair of second beams, and the at least one support beam is configured to separate a space enclosed by the pair of first beams and the pair of second beams into a plurality of subspaces.

7. The bracket according to claim 6, wherein the bracket comprises a second locking mechanism, and the second locking mechanism is installed on a second beam of the second beams and is configured to lock the box bodies of the batteries to the second beam.

8. The bracket according to claim 7, wherein the second locking mechanism is arranged inside the second beam.

9. The bracket according to claim 8, wherein the second beam comprises a second beam body and a second beam cover body; a cross section of the second beam body is U-shaped, and the second beam body is provided with a second opening; the second locking mechanism is arranged inside the second beam body, and the second beam cover body covers the second opening of the second beam body.

10. The bracket according to claim 9, wherein the second opening of the second beam body is downward.

11. The bracket according to claim 7, wherein the second beam is provided with a second channel extending along a gravity direction, and the second channel extends to a lower surface of the second beam to make a second locking part arranged in the box body be capable of entering and exiting the second channel;
   the second locking mechanism is configured to lock the second locking part when the second locking part moves upwards to a preset position of the second channel; and the second locking mechanism is configured to release the locking to the second locking part, so that the second locking part moves downwards under the action of the gravity of the battery to be separated from the second channel.

12. The bracket according to claim 6, wherein the second beam is provided with a third connecting part for being connected to the power consumption device body.

13. The bracket according to claim 1, wherein the plurality of subspaces are of equal dimensions in the length direction of the first beams.

14. The bracket according to claim 13, wherein the dimension of each subspace in the length direction of the first beam is 400 mm to 800 mm.

15. The bracket according to claim 1, wherein a first beam of the first beams is provided with a first connecting part for being connected to the power consumption device body, and/or, a support beam of the at least one support beam is provided with a second connecting part for being connected to the power consumption device body.

16. A battery assembly, comprising a plurality of batteries and a bracket, wherein the bracket for being connected to batteries and a power consumption device body, a battery of the batteries comprising a box body and a battery cell accommodated in the box body, wherein the bracket comprises:
- a pair of first beams, the pair of first beams being oppositely arranged;
- at least one support beam, wherein each support beam is connected to the pair of first beams, a space between the pair of first beams is separated by the at least one support beam into a plurality of subspaces, the plurality of subspaces are arranged along a length direction of the first beams; and
- a first locking mechanism, and the first locking mechanism is installed on a support beam of the at least one support beam and is configured to lock box bodies of the batteries on the support beam;
- wherein at least one of the batteries is accommodated in each subspace of the bracket, two adjacent subspaces are separated by each support beam and each support beam is configured to install the box bodies of the batteries accommodated in the two adjacent subspaces;
- wherein the support beam is provided with a first channel extending along a gravity direction, and the first channel extends to a lower surface of the support beam to make a first locking part arranged in the box body be capable of entering and exiting the first channel, so that a direction of a movement of the first locking part is configured to be along the gravity direction rather than a horizontal direction perpendicular to the gravity direction;
- the first locking mechanism is configured to lock the first locking part when the first locking part moves upwards to a preset position of the first channel; and the first locking mechanism is configured to release the locking of the first locking part, so that the first locking part moves downwards under the action of gravity of the battery to be separated from the first channel.

17. A power consumption device, comprising a power consumption device body and a battery assembly, wherein battery assembly comprising a plurality of batteries and a bracket, and the bracket for being connected to batteries and a power consumption device body, a battery of the batteries comprising a box body and a battery cell accommodated in the box body, wherein the bracket comprises:
- a pair of first beams, the pair of first beams being oppositely arranged;
- at least one support beam, wherein each support beam is connected to the pair of first beams,
- a space between the pair of first beams is separated by the at least one support beam into a plurality of subspaces, the plurality of subspaces are arranged along a length direction of the first beams; and
- a first locking mechanism, and the first locking mechanism is installed on a support beam of the at least one support beam and is configured to lock the box bodies of the batteries on the support beam;
- wherein at least one of the batteries is accommodated in each subspace of the bracket, two adjacent subspaces are separated by each support beam and each support beam is configured to install the box bodies of the batteries accommodated in the two adjacent subspaces;
- wherein the support beam is provided with a first channel extending along a gravity direction, and the first channel extends to a lower surface of the support beam to make a first locking part arranged in the box body be capable of entering and exiting the first channel, so that a direction of a movement of the first locking part is configured to be along the gravity direction rather than a horizontal direction perpendicular to the gravity direction;
- the first locking mechanism is configured to lock the first locking part when the first locking part moves upwards to a preset position of the first channel; and the first locking mechanism is configured to release the locking of the first locking part, so that the first locking part moves downwards under the action of gravity of the battery to be separated from the first channel.

* * * * *